(12) United States Patent
Araki et al.

(10) Patent No.: US 8,065,483 B2
(45) Date of Patent: *Nov. 22, 2011

(54) STORAGE APPARATUS AND CONFIGURATION SETTING METHOD

(75) Inventors: Kashie Araki, Odawara (JP); Masanobu Yamamoto, Odawara (JP); Tomoyuki Kato, Odawara (JP); Kei Sato, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 12/471,664

(22) Filed: May 26, 2009

(65) Prior Publication Data

US 2009/0240883 A1 Sep. 24, 2009

Related U.S. Application Data

(63) Continuation of application No. 11/592,210, filed on Nov. 3, 2006, now Pat. No. 7,555,600.

(30) Foreign Application Priority Data

Sep. 14, 2006 (JP) ................................. 2006-249004

(51) Int. Cl.
*G06F 12/00* (2006.01)
(52) U.S. Cl. ........................................................ 711/114
(58) Field of Classification Search .................. None
See application file for complete search history.

(56) References Cited

U.S. PATENT DOCUMENTS

| | | | |
|---|---|---|---|
| 5,857,112 A | 1/1999 | Hashemi et al. | |
| 7,133,907 B2 | 11/2006 | Carlson et al. | |
| 7,305,533 B2 * | 12/2007 | Sato et al. | 711/162 |
| 7,337,299 B2 * | 2/2008 | Sakaki et al. | 711/203 |
| 7,555,600 B2 * | 6/2009 | Araki et al. | 711/114 |
| 2003/0093501 A1 | 5/2003 | Carlson et al. | |
| 2004/0123062 A1 | 6/2004 | Dalal et al. | |
| 2005/0114438 A1 | 5/2005 | Bendich et al. | |
| 2005/0114474 A1 | 5/2005 | Anderson et al. | |
| 2006/0101204 A1 | 5/2006 | Bao | |
| 2006/0101304 A1 | 5/2006 | Miura et al. | |

FOREIGN PATENT DOCUMENTS

| | | |
|---|---|---|
| JP | 2006-107488 | 4/2006 |
| JP | 2006-134026 | 5/2006 |
| JP | 2006-134196 | 5/2006 |
| WO | 03/027856 A1 | 4/2003 |

* cited by examiner

*Primary Examiner* — Hiep Nguyen
(74) *Attorney, Agent, or Firm* — Mattingly & Malur, PC

(57) ABSTRACT

This storage apparatus has a plurality of physical devices for storing data sent from a host system, and includes a physical device group setting unit for setting a physical device group from the plurality of physical devices based on a policy file which lists matters to be operated and set by an administrator as parameters in advance, and information on the physical devices, a first logical device setting unit for setting a first logical device from the physical device group based on information on the physical device group and the policy file set with the physical device group setting unit, and a second logical device setting unit for setting a second logical device from the first logical device based the information on the first logical device and the policy file set with the first logical device setting unit.

15 Claims, 20 Drawing Sheets

- 81 — CHANNEL ADAPTER MOUNTING INFORMATION
- 82 — DISK ADAPTER MOUNTING INFORMATION
- 83 — CACHE MEMORY MOUNTING INFORMATION
- 84 — SHARED MEMORY MOUNTING INFORMATION
- 85 — FIBRE CHANNEL SWITCH MOUNTING INFORMATION
- 86 — PHYSICAL DEVICE MOUNTING INFORMATION

- 91 — PHYSICAL DEVICE CONNECTION INFORMATION
- 92 — PHYSICAL DEVICE ARRANGEMENT INFORMATION

- 101 — PHYSICAL DEVICE TYPE
- 102 — END LBA

FIG.9

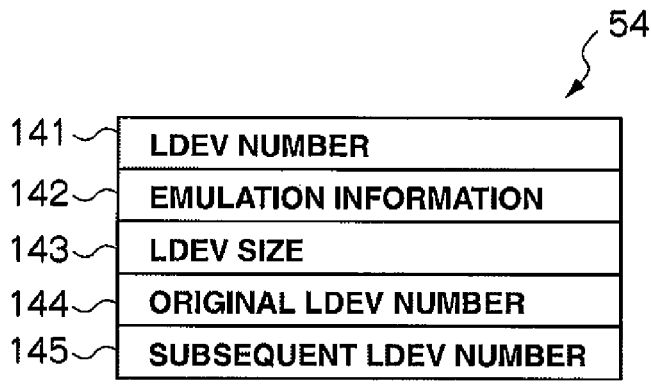

- 141 — LDEV NUMBER
- 142 — EMULATION INFORMATION
- 143 — LDEV SIZE
- 144 — ORIGINAL LDEV NUMBER
- 145 — SUBSEQUENT LDEV NUMBER

FIG.10

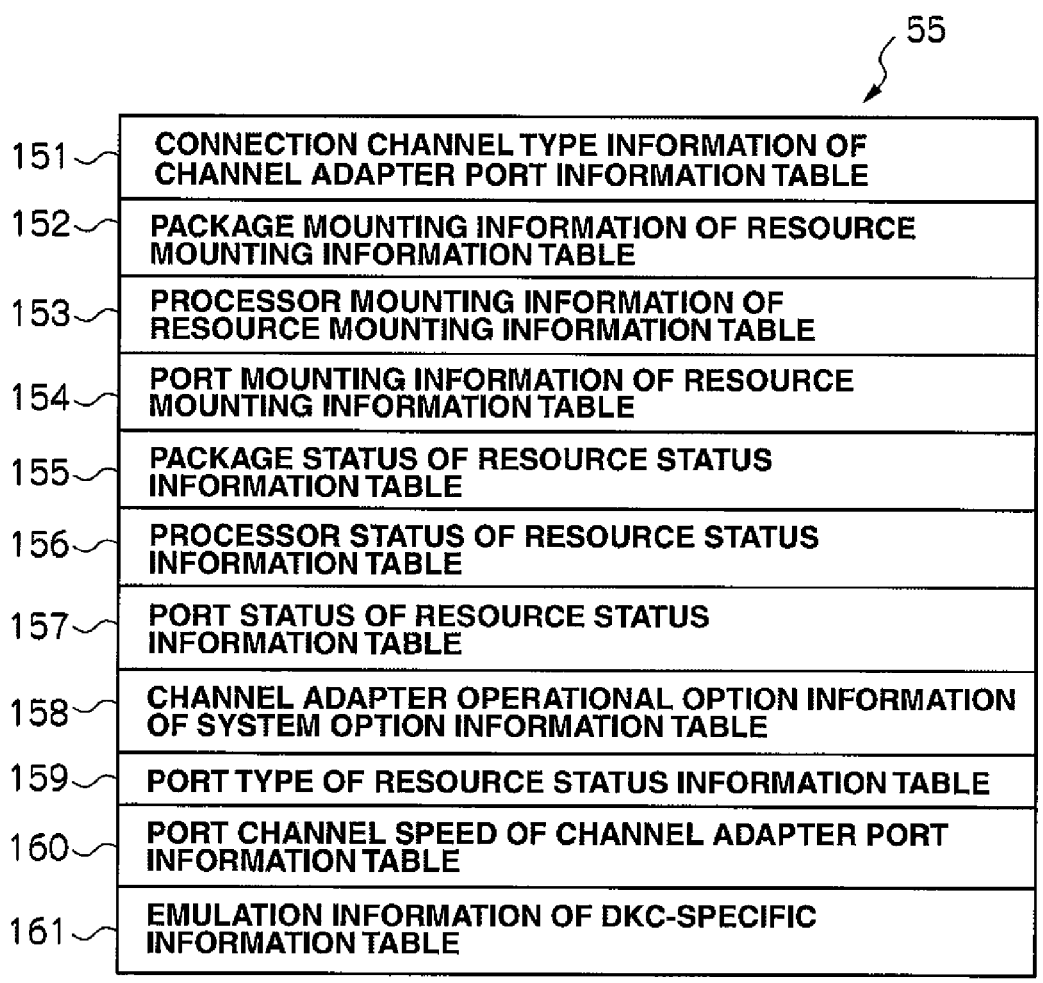

- 151 — CONNECTION CHANNEL TYPE INFORMATION OF CHANNEL ADAPTER PORT INFORMATION TABLE
- 152 — PACKAGE MOUNTING INFORMATION OF RESOURCE MOUNTING INFORMATION TABLE
- 153 — PROCESSOR MOUNTING INFORMATION OF RESOURCE MOUNTING INFORMATION TABLE
- 154 — PORT MOUNTING INFORMATION OF RESOURCE MOUNTING INFORMATION TABLE
- 155 — PACKAGE STATUS OF RESOURCE STATUS INFORMATION TABLE
- 156 — PROCESSOR STATUS OF RESOURCE STATUS INFORMATION TABLE
- 157 — PORT STATUS OF RESOURCE STATUS INFORMATION TABLE
- 158 — CHANNEL ADAPTER OPERATIONAL OPTION INFORMATION OF SYSTEM OPTION INFORMATION TABLE
- 159 — PORT TYPE OF RESOURCE STATUS INFORMATION TABLE
- 160 — PORT CHANNEL SPEED OF CHANNEL ADAPTER PORT INFORMATION TABLE
- 161 — EMULATION INFORMATION OF DKC-SPECIFIC INFORMATION TABLE

FIG.12

| | | 57 |
|---|---|---|
| 181 | CAPACITY INFORMATION OF TUNING INFORMATION TABLE | |
| 182 | MODULE INFORMATION OF RESOURCE MOUNTING INFORMATION TABLE | |
| 183 | PACKAGE INFORMATION OF RESOURCE MOUNTING INFORMATION TABLE | |
| 184 | STATUS INFORMATION OF CACHE MEMORY IN CLUSTER UNITS OF RESOURCE MOUNTING INFORMATION TABLE | |
| 185 | NUMBER OF MODULES OF CACHE MEMORY OF RESOURCE STATUS INFORMATION TABLE | |
| 186 | MODULE STATUS OF RESOURCE STATUS INFORMATION TABLE | |
| 187 | PACKAGE STATUS OF RESOURCE STATUS INFORMATION TABLE | |
| 188 | STATUS OF CACHE MEMORY IN CLUSTER UNITS OF RESOURCE STATUS INFORMATION TABLE | |
| 189 | RESIDENT EXTENT UPPER LIMIT INFORMATION PER CACHE LOGICAL PARTITION OF TUNING INFORMATION TABLE | |

FIG.13

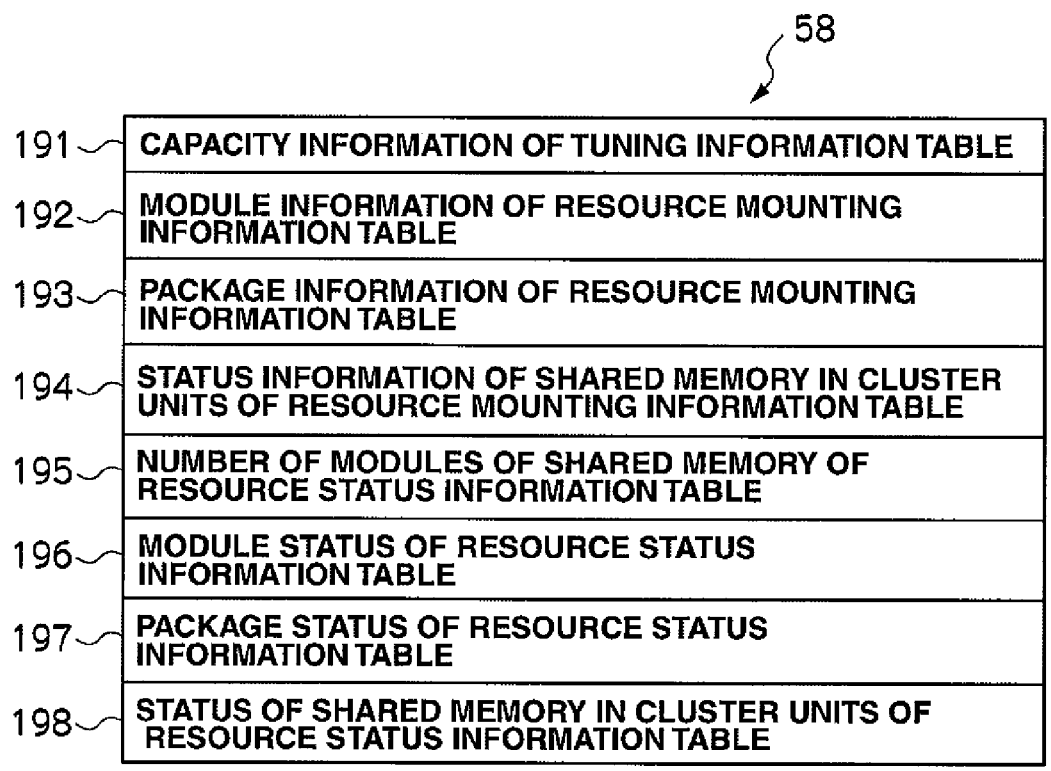

- 191 — CAPACITY INFORMATION OF TUNING INFORMATION TABLE
- 192 — MODULE INFORMATION OF RESOURCE MOUNTING INFORMATION TABLE
- 193 — PACKAGE INFORMATION OF RESOURCE MOUNTING INFORMATION TABLE
- 194 — STATUS INFORMATION OF SHARED MEMORY IN CLUSTER UNITS OF RESOURCE MOUNTING INFORMATION TABLE
- 195 — NUMBER OF MODULES OF SHARED MEMORY OF RESOURCE STATUS INFORMATION TABLE
- 196 — MODULE STATUS OF RESOURCE STATUS INFORMATION TABLE
- 197 — PACKAGE STATUS OF RESOURCE STATUS INFORMATION TABLE
- 198 — STATUS OF SHARED MEMORY IN CLUSTER UNITS OF RESOURCE STATUS INFORMATION TABLE

FIG.15

| COLUMN \ LINE | A | B | C | D | E | F | G |
|---|---|---|---|---|---|---|---|
| A | 1 | 0 | 0 | 0 | 1 | 1 | 0 |
| B | 0 | 1 | 1 | 0 | 0 | 0 | 0 |
| C | 0 | 1 | 1 | 0 | 0 | 0 | 0 |
| D | 0 | 0 | 0 | 1 | 0 | 0 | 1 |
| E | 1 | 0 | 0 | 0 | 1 | 1 | 0 |
| F | 1 | 0 | 0 | 0 | 1 | 1 | 0 |
| G | 0 | 0 | 0 | 1 | 0 | 0 | 1 |

61

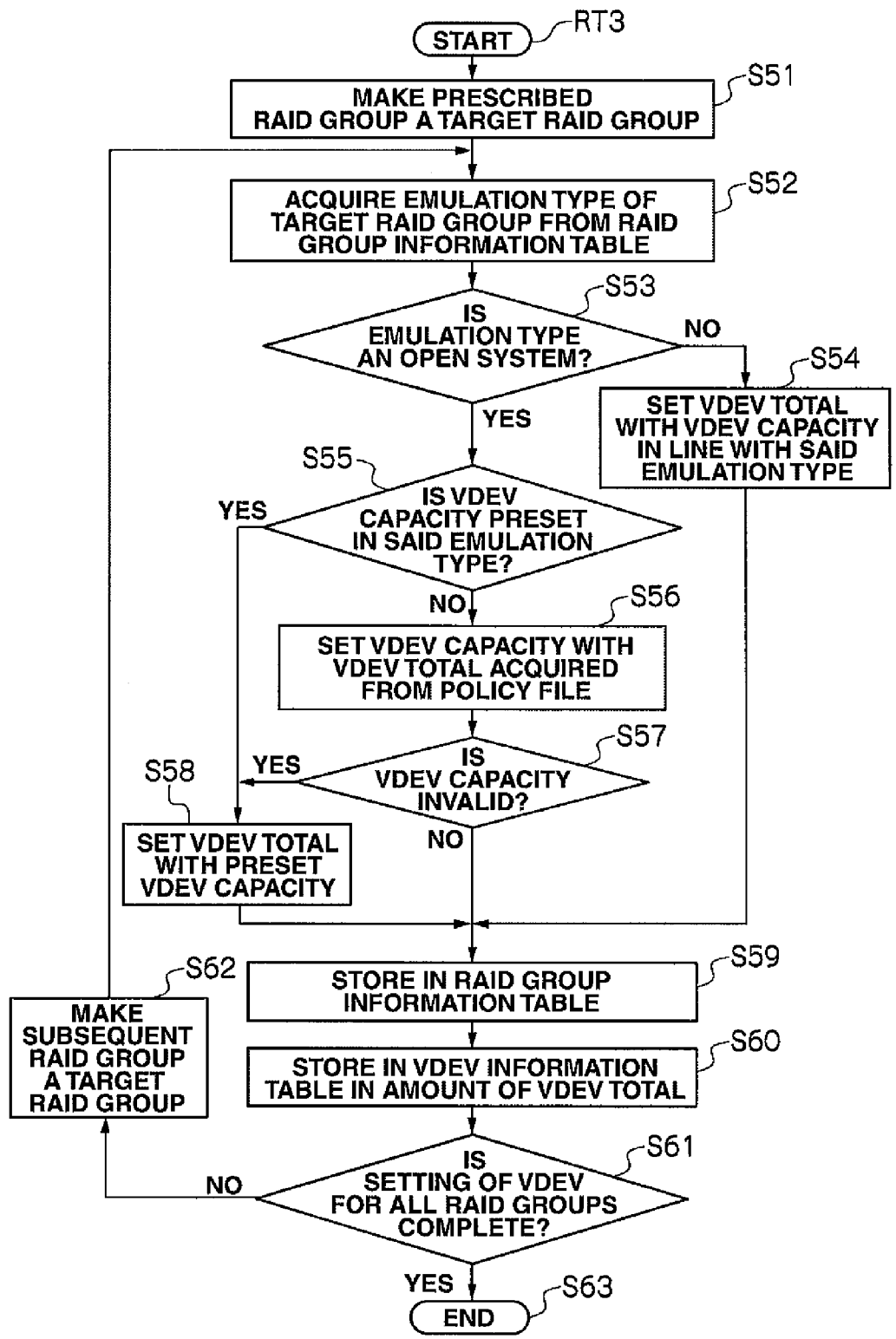

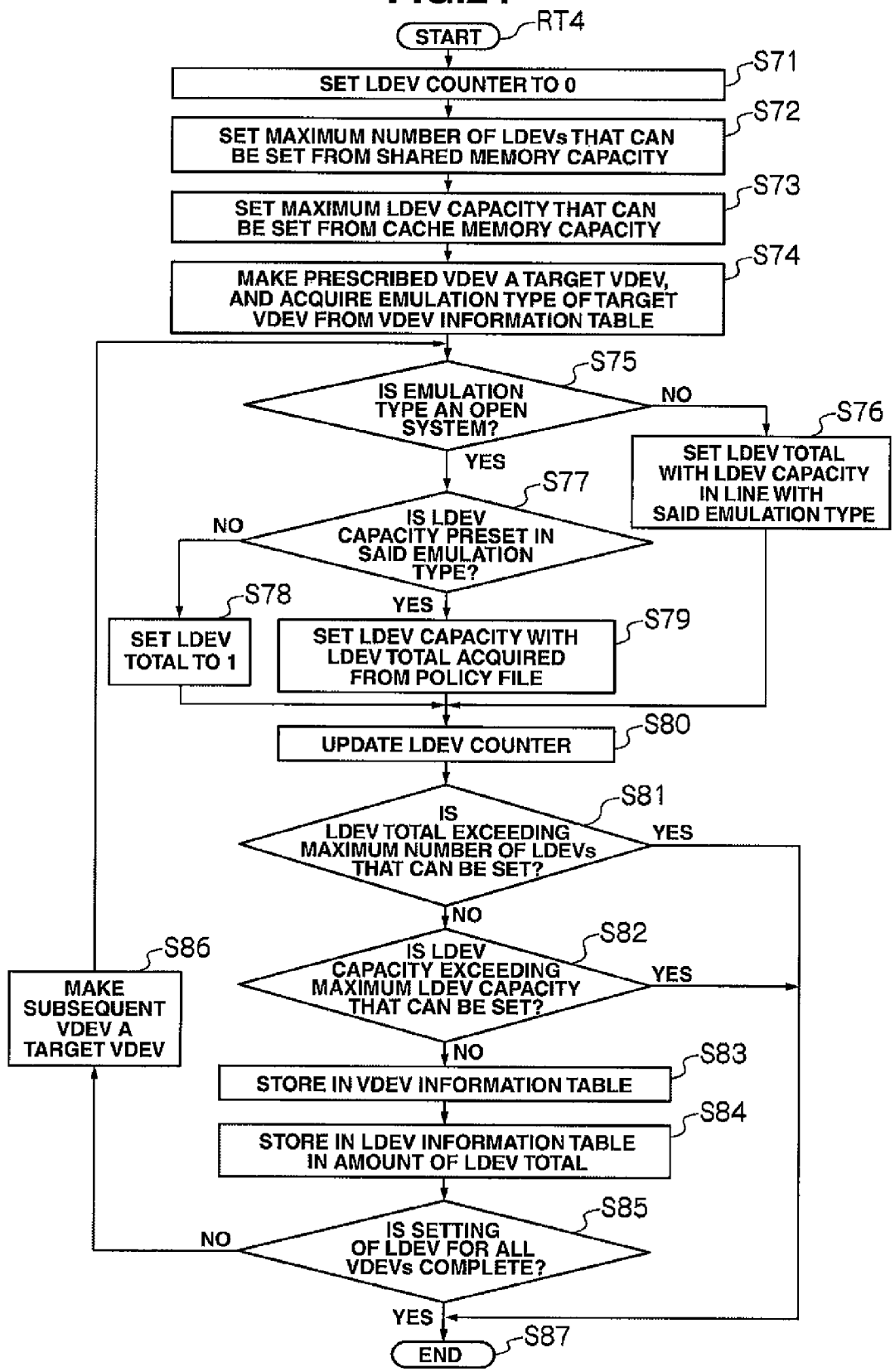

STORAGE APPARATUS AND CONFIGURATION SETTING METHOD

CROSS-REFERENCES

This is a continuation application of U.S. Ser. No. 11/592,210, filed Nov. 3, 2006, the entire disclosure of which is hereby incorporated by reference.

This application relates to and claims priority from Japanese Patent Application No. 2006-249004, filed on Sep. 14, 2006, the entire disclosure of which is incorporated herein by reference.

BACKGROUND

The present invention generally relates to a storage apparatus and a configuration setting method, and, for instance, can be suitably applied to a storage apparatus that sets the configuration of a logical device from a physical device.

Conventionally, a computer system that connects a host system and a storage apparatus with a network, and stores data processed with the host system in a storage apparatus via the network has been put into practical application.

Here, this conventional storage apparatus, for instance, foremost creates a physical device group (RAID group) by configuring a plurality of physical devices in a RAID (Redundant Array of Independent Disks) configuration, creates a second logical device (LDEV) by logically dividing a first logical device (VDEV) as an address space of the physical device group (RAID group), and provides such second logical device (LDEV) to the host system.

Incidentally, as background art in this technical field, Japanese Patent Laid-Open Publication No. 2006-134196 proposes a disk array device wherein a memory control unit monitors the access status of a memory, issues a diagnosis request when normal access is not being made to the memory device, executes access for diagnosing the memory data to the memory device, and detects data failure by checking the contents of the data read from the memory device.

Further, Japanese Patent Laid-Open Publication No. 2006-107488 proposes a configuration method of searching for configuration information unique to a position corresponding to a physical position, and configuring a computer system based the searched configuration information.

Moreover, Japanese Patent Laid-Open Publication No. 2006-134026 proposes a disk array apparatus that stores data in a plurality of storages by reading additional information of data input from an external device, weighing data based on such additional information, and selecting the optimal RAID level for each data based on the additional information of data by selecting the RAID level based on the weighting of such data.

Nevertheless, with a conventional storage apparatus, an administrator of the storage apparatus needs to manually input the configuration of the physical device group (RAID group), the first logical device (VDEV) and the second logical device (LDEV), and the administrator must engage in complicated procedures to set the configuration of the second logical device (LDEV) and other devices. Further, since the definition and concept of the second logical device (LDEV) and other devices are complicated, there is a problem in that much time is required to set the second logical device (LDEV) and other devices, and much time is required in training the administrator.

SUMMARY

The present invention was made in view of the foregoing problems. Thus, an object of this invention is to propose a storage apparatus and a configuration setting method that can be easily operated by an administrator.

In order to achieve the foregoing object, the present invention provides a storage apparatus having a plurality of physical devices for storing data sent from a host system. This storage apparatus comprises a physical device group setting unit for setting a physical device group from the plurality of physical devices based on a policy file which lists matters to be operated and set by an administrator as parameters in advance, and information on the physical devices, a first logical device setting unit for setting a first logical device from the physical device group based on information on the physical device group and the policy file set with the physical device group setting unit, and a second logical device setting unit for setting a second logical device from the first logical device based the information on the first logical device and the policy file set with the first logical device setting unit.

Accordingly, since the physical device group, the first logical device and the second logical device can be automatically set from a plurality of physical devices, it is possible to effectively prevent the complicated procedures to be performed by the administrator such as manually inputting and configuring the physical device group, the first logical device and the second logical device.

The present invention further provides a configuration setting method of a storage apparatus having a plurality of physical devices for storing data sent from a host system. This configuration setting method comprises a first step of setting a physical device group from the plurality of physical devices based on a policy file which lists matters to be operated and set by an administrator as parameters in advance, and information on the physical devices, a second step of setting a first logical device from the physical device group based on information on the physical device group and the policy file set with the physical device group setting unit, and a third step of setting a second logical device from the first logical device based on information on the first logical device and the policy file set with the first logical device setting unit.

Accordingly, since the physical device group, the first logical device and the second logical device can be automatically set from a plurality of physical devices, it is possible to effectively prevent the complicated procedures to be performed by the administrator such as manually inputting and configuring the physical device group, the first logical device and the second logical device.

According to the present invention, since the physical device group, first logical device and the second logical device can be automatically set from a plurality of physical devices by setting a physical device group from the plurality of physical devices based on a policy file which lists matters to be operated and set by an administrator as parameters in advance, and information on the physical devices, setting a first logical device from the physical device group based on information on the physical device group and the policy file set with the physical device group setting unit, and setting a second logical device from the first logical device based on information on the first logical device and the policy file set with the first logical device setting unit, it is possible to effectively prevent the complicated procedures to be performed by the administrator such as manually inputting and configuring the physical device group, the first logical device and the second logical device, and realize a storage apparatus and a configuration setting method that can be easily operated by an administrator.

DESCRIPTION OF DRAWINGS

FIG. 9 is a conceptual diagram explaining the LDEV information table;

FIG. 10 is a conceptual diagram explaining the channel adapter configuration information table;

FIG. 12 is a conceptual diagram explaining the cache memory configuration information table;

FIG. 13 is a conceptual diagram explaining the shared memory configuration information table;

FIG. 15 is a conceptual diagram explaining the RAID group compatibility index table

FIG. 23 is a flowchart showing the VDEV configuration processing routine; and

FIG. 24 is a flowchart showing the LDEV configuration processing routine.

DETAILED DESCRIPTION

An embodiment of the present invention is now explained in detail with reference to the attached drawings.

Figure 1:
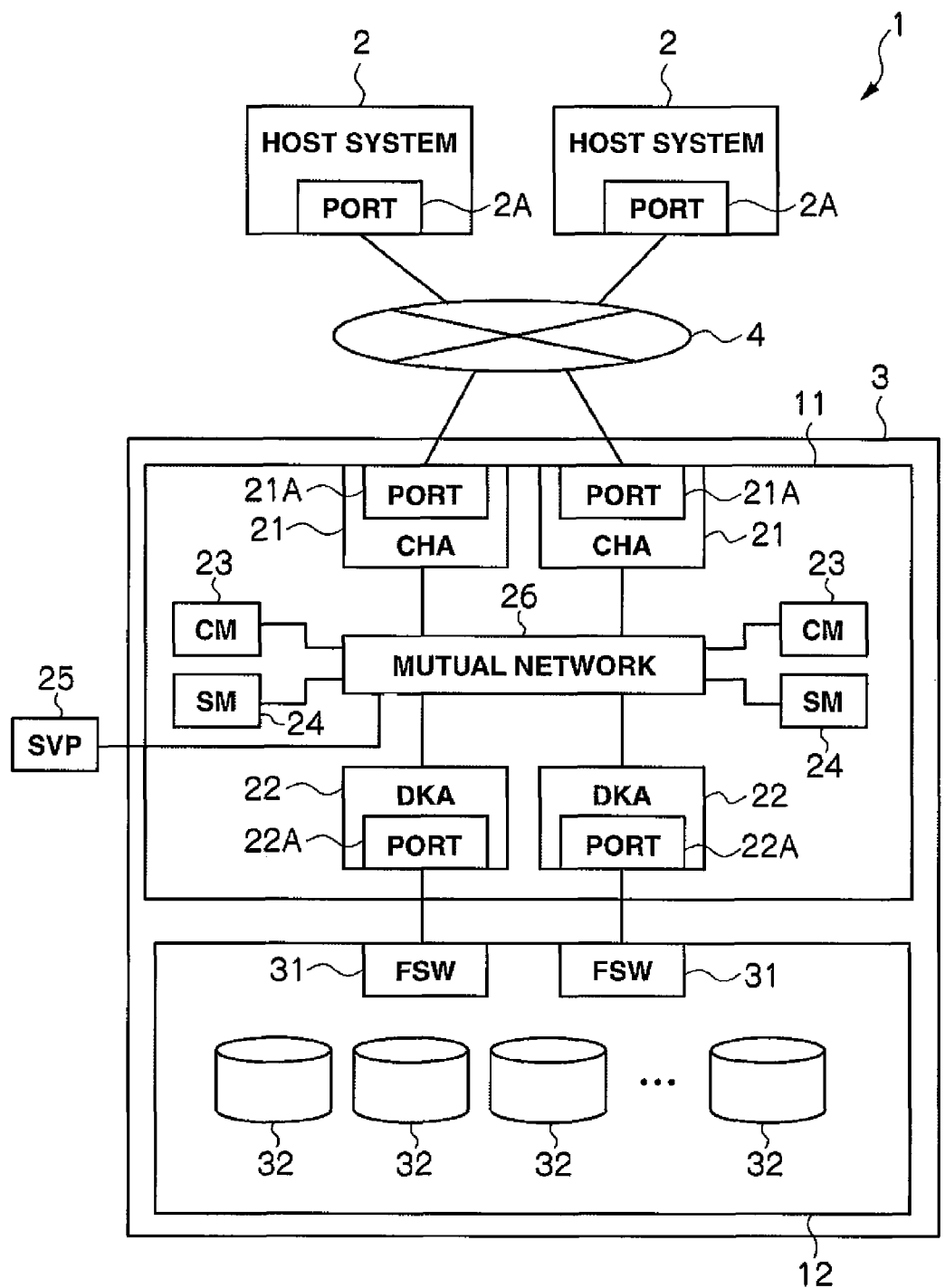
FIG. 1 is a block diagram showing a schematic configuration of the storage system according to an embodiment of the present invention.

FIG. 1 shows the system configuration of a storage system 1 according to the present embodiment. The storage system 1 comprises a host system 2 and a storage apparatus 3.

The host system 2 and the storage apparatus 3 are mutually connected via a network 4. As the network 4, for instance, SAN (Storage Area Network), LAN (Local Area Network), internet, dedicated line, public line or the like may be used. When the network 4 is a LAN, the host system 2 requests the data I/O in file units to the storage apparatus 3 based on a TCP/IP (Transmission Control Protocol/Internet Protocol). When the network 4 is a SAN, the host system 2 requests the data I/O in block units to the storage apparatus 3 based on a fibre channel protocol.

The host system 2 is a business host system that is used in ATM systems of banks and seat reservation systems of airline companies. The host system 2 is configured as a microcomputer system comprising a CPU (Central Processing Unit) and a memory, and, for instance, is a workstation, a mainframe, a personal computer or the like. The host system 2 comprises a port 2A. The port 2A is a network component for the host system 2 to communicate with the storage apparatus 3. Further, the host system 2 comprises various types of software (not shown) such as an operating system, storage management software (RAID manager) and application software. The storage management software, for instance, manages the storage resources of the storage apparatus 3. As the application software, for example, database software, Web application software, streaming application software, E-business application software and the like may be used.

Incidentally, when the network 4 is a LAN, a LAN-compatible network card is used as the port 21. When the network 4 is a SAN, an HBA (Host Bus Adapter) is used as the port 21.

The storage apparatus 3 comprises a disk controller (DKC) 11 and a physical device unit 12. The disk controller 11 comprises a plurality of channel adapters (CHA) 21, a plurality of disk adapters (DKA) 22, a cache memory (CM) 23, a shared memory (SM) 24, a management terminal (SVP) 25 and a mutual network 26. The physical device unit 12 comprises a plurality of fibre channel switches (FSW) 31 and a plurality of physical devices (PDEV (Physical Devices)) 32.

The respective channel adapters 21 are configured from a microcomputer system comprising a CPU and a memory, and perform data communication with the host system 2. The channel adapter 21 comprises a port 21A for inputting and outputting data to and from the host system 2. A unique network address is assigned to the respective channel adapters 21, and the respective channel adapters 21 are able to function independently as a NAS (Network Attached Storage). As a network address, an IP address, a WWN (World Wide Name) or the like can be used. When there are a plurality of host systems 2, the respective channel adapters 21 individually receive and process requests from the host systems 2.

Each disk adapter 22 is configured as a microcomputer system comprising a CPU and a memory, and controls the reading and writing of data from and in the physical device 32. The disk adapter 22 comprises a port 22A for inputting and outputting data in and from the fibre channel switch 31. Each disk adapter 22, for instance, writes data that the channel adapter 21 received from the host system 2 in a prescribed address of the physical device 32. Further, each disk adapter 22 sends the data read from the physical device 32 to the channel adapter 21.

When each disk adapter 22 is to read or write data in or from the physical device 32, it converts a logical address into a physical address. When the physical device 32 is managed according to a RAID configuration, each disk adapter 22 performs data access according to the RAID configuration. For example, each disk adapter 22 writes the same data into separate physical device groups (RAID groups), or executes parity operation to write data and parity data in the physical device group.

The cache memory 23 temporarily stores data received from the host system 2, or temporarily stores data read from the physical device 32. The shared memory 24 stores various tables such as configuration information on the storage apparatus 3 and control information required for system management. Incidentally, details regarding these various tables will be described later with reference to the drawings.

Incidentally, one or more physical devices 32 may be used as a cache disk. Further, the cache memory 23 and the shared memory 24 may be respectively configured as a separate memory, or the storage extent of a part of the same memory may be used as a cache extent, and the other storage extent may be used as a control extent.

The management terminal 25 is a terminal device for maintaining or managing the respective channel adapters 21, the respective disk adapters 22, the cache memory 23 and the shared memory 24, and, for instance, is configured from a laptop personal computer. The management terminal 25 is respectively connected to the respective channel adapters 21, the respective disk adapters 22, the cache memory 23 and the shared memory 24 via the mutual network 26. The management terminal 25 is able to define the system configuration information or the like based on operations by the administrator, and send the defined system configuration information to the shared memory 13 via the mutual network 26. Further, the management terminal 25, as described later, sends a policy file 73 to the shared memory 13 via the mutual network 26 based on a request from a prescribed channel adapter 21. Incidentally, in the present embodiment, it is also possible to send the policy file 73 to the channel adapter 21 that requested such policy file 73 via the mutual network 26, and store it in a memory (not shown) of the channel adapter 21.

The mutual network 26 mutually connects the respective channel adapters 21, the respective disk adapters 22, the cache memory 23, the shared memory 24 and the management terminal 25. The mutual network 26, for instance, is a high-speed bus such as an ultra-fast crossbar switch that transfers data according to high-speed switching operations.

The fibre channel switch 31 switches the data transfer path for relaying to the target physical device 32 the access request of a block level, data to be written, data to be read and the like from the disk adapter 22. Further, the fibre channel switch 31 comprises a connection detection switch (not shown) in a case for housing the physical device 32, and detects whether the physical device 32 is connected.

The physical device 32, for instance, is a storage device having a real storage extent such as a hard disk drive, a flexible disk drive, a magnetic tape drive, a semiconductor memory drive, or an optical disk drive. Further, as the hard disk drive, for example, a plurality of disk drives having different characteristics such as a fibre channel disk drive, a serial ATA (Advanced Technology Attachment) disk drive, a parallel ATA disk drive, a SCSI disk drive or the like may be used, or one type of disk drive among the above may be used.

Incidentally, the administrator can set the access authority of the host system 2 by introducing a method such as SAN zoning or LUN masking in the network 4. Further, as the storage apparatus 3, a storage system such as a disk array system may be employed, or a virtualization switch that will personally become a SCSI (Small Computer System Interface) target may also be used. Moreover, with the storage apparatus 3, the channel adapter 21, the disk adapter 22, the cache memory 23, and the shared memory 24 are made redundant, or the disk controller 11 itself is made redundant to realize a cluster configuration. Here, it is required that the configuration information of the channel adapter 21, the disk adapter 22, the cache memory 23, the shared memory 24 and the disk controller 11 itself is completely identical.

Figure 2:
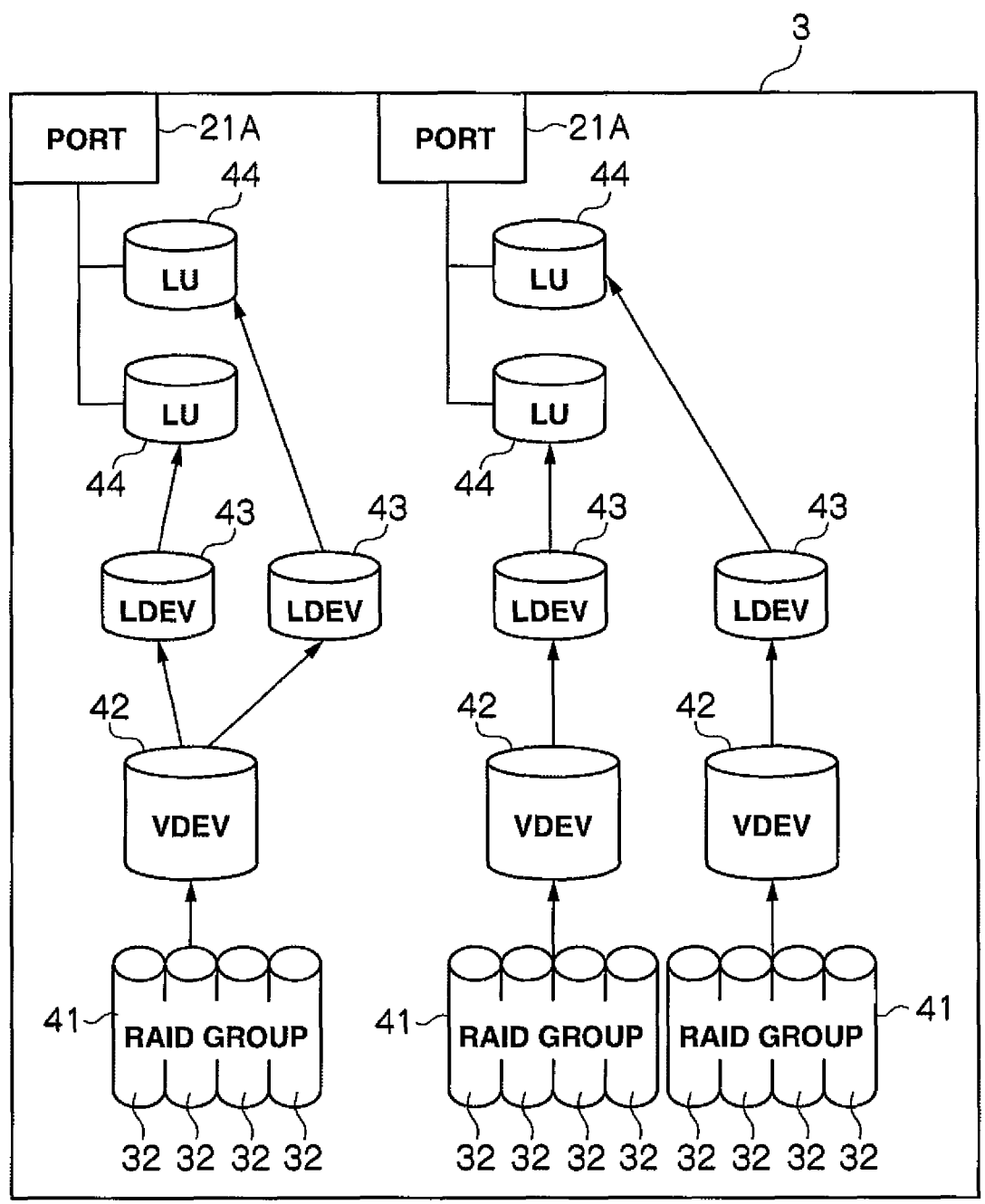
FIG. 2 is a conceptual diagram explaining the storage hierarchy created in the storage apparatus.

FIG. 2 shows a storage hierarchy configured in the storage apparatus 3. The storage hierarchy configured in the storage apparatus 3 can be broadly classified into a physical storage hierarchy and a logical storage hierarchy. The physical storage hierarchy is configured from a physical device group (hereinafter referred to as a RAID group) 41 configured from a plurality of physical devices 32.

The logical storage hierarchy is configured from a plurality of (i.e., 2 types of) hierarchies. One logical hierarchy is configured from a first logical device (hereinafter referred to as a VDEV (Virtual Device)) 42. The other logical hierarchy is configured from a second logical device (hereinafter referred to as a LDEV (Logical Device)) 43.

The VDEV 42, for instance, is configured by grouping a set of 4 physical devices 32 (3D+1P), or grouping a set of 8 physical devices 32 (7D+1P). In other words, a single RAID group 41 is formed by the storage extents respectively provided by the plurality of physical devices 32 being aggregated, and the address space of this RAID group 41 becomes VDEV 42.

Incidentally, other RAID configurations can also be applied to the VDEV 42. In other words, one physical device 32 can be assigned to a plurality of VDEVs 42 (slicing), or one VDEV 42 can be formed from a plurality of physical devices 32 (striping).

At least one or more LDEVs 43 may be provided on the VDEV 42. The LDEV 43, for example, is configured by dividing the VDEV 42 in a fixed length.

When the host system 2 is an open system, by the LDEV 43 being mapped to a logical unit (hereinafter referred to as a LU (Logical Unit)) 44, the host system 2 will recognize the LDEV 43 as one physical device. The host system 2 accesses a desired LDEV 43 by designating a LUN (Logical Unit Number) or a logical block address (hereinafter referred to as a LBA (Logical Brock Address)). Incidentally, when the host system 2 is a mainframe system, the host system 2 will directly recognize the LDEV 43.

The LU 44 is a logical storage unit recognized by the host system 2. For example, when the host system 2 is a UNIX (registered trademark) system, the LU 44 is associated to the device file (Device File). Or, when the host system 2 is a Windows (registered trademark) system, the LU 44 is associated to the drive letter (drive name). Each LU 44 is connected to the host system 2 via the port 21A. At least one or more LDEVs 43 can be mapped to each LU 44. By mapping a plurality of LDEVs 43 to one LU 44, the size of the LU 44 can be virtually expanded.

Figure 3:
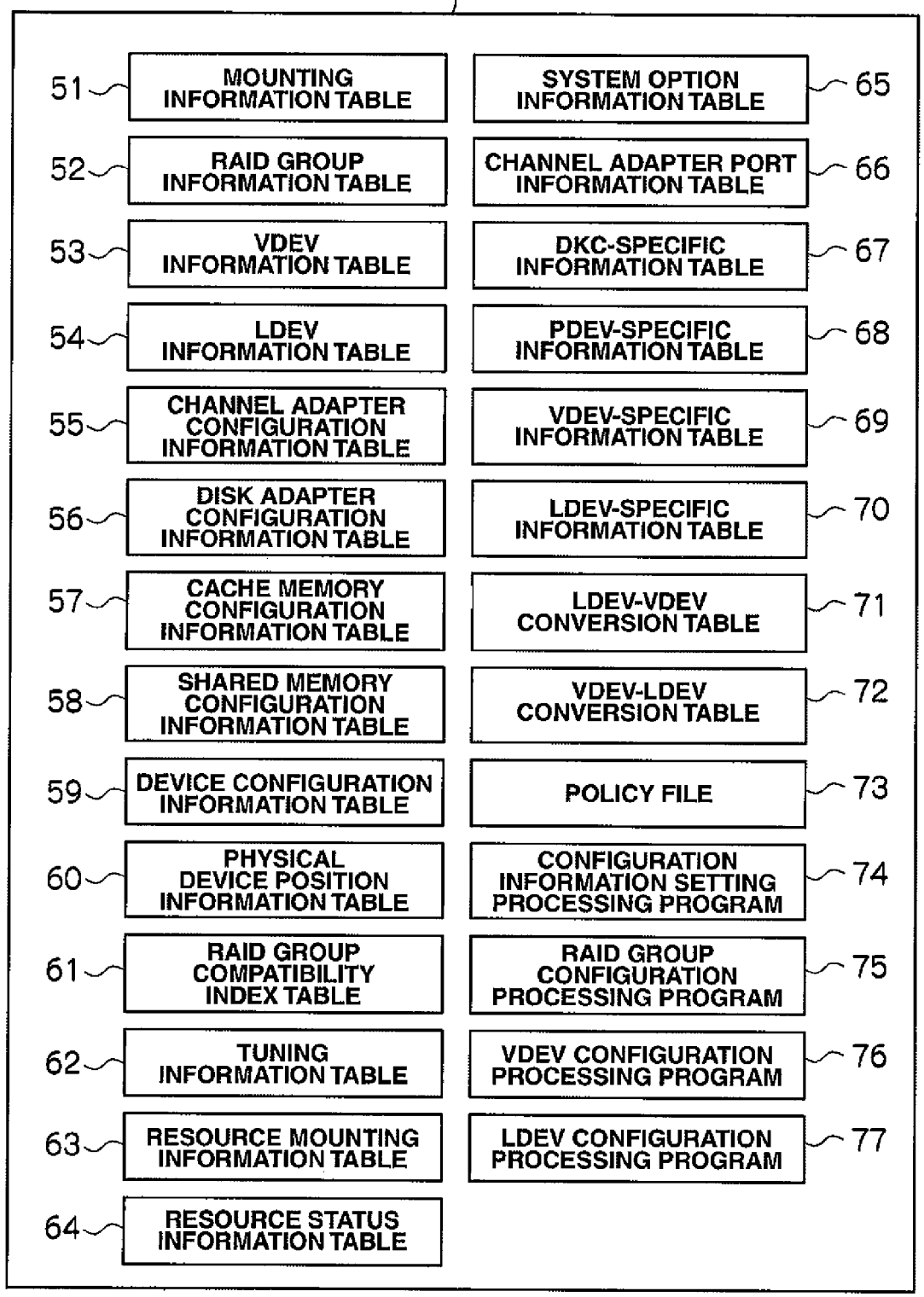
FIG. 3 is a conceptual diagram explaining various tables and programs in the shared memory.

FIG. 3 shows various tables stored in the shared memory 24. The shared memory 24 stores a mounting information table 51, a RAID group information table 52, a VDEV information table 53, a LDEV information table 54, a channel adapter configuration information table 55, a disk adapter configuration information table 56, a cache memory configuration information table 57, a shared memory configuration information table 58, a device configuration information table 59, a physical device position information table 60 and a RAID group compatibility index table 61. Incidentally, the detailed explanation of these various tables will be explained later with reference to the drawings.

Further, the shared memory 24 stores a tuning information table 62 for storing type information and adjustable parameters of various constituent elements of the channel adapter 21, the disk adapter 22, the cache memory 23, the shared memory 24, the fibre channel switch 31 and the physical device 32, a resource mounting information table 63 for storing detailed information on various loaded constituent elements, a resource status information table 64 for storing information regarding whether various loaded constituent elements are operating normally or closed, a system option information table 65 for storing option information showing the operation of various constituent elements, a channel adapter port information table 66 for storing detailed information on the port 21A of the channel adapter 21, and a DKC-specific information table 67 for storing information unique to the mounted disk controller 11.

Further, the shared memory 24 stores a PDEV-specific information table 68 for storing information unique to the mounted physical device 32 until information is stored in the RAID group information table 52, a VDEV-specific information table 69 for storing information unique to the mounted VDEV 42 until information is stored in the VDEV information table 53, a LDEV-specific information table 70 for storing information unique to the mounted LDEV 43 until information is stored in the LDEV information table 54, a LDEV-VDEV conversion table 71 for storing information related to the LDEV 43 and VDEV 42 based around the LDEV 43, a VDEV-LDEV conversion table 72 for storing information related to the VDEV 42 and LDEV 43 based around the VDEV 42, and a policy file 73.

Further, the shared memory 24 stores a configuration information setting processing program 74, a RAID group configuration processing program 75, a VDEV configuration processing program 76 and a LDEV configuration processing program 77. A detailed explanation of various programs will be explained later with reference to the flowchart.

Figure 4:
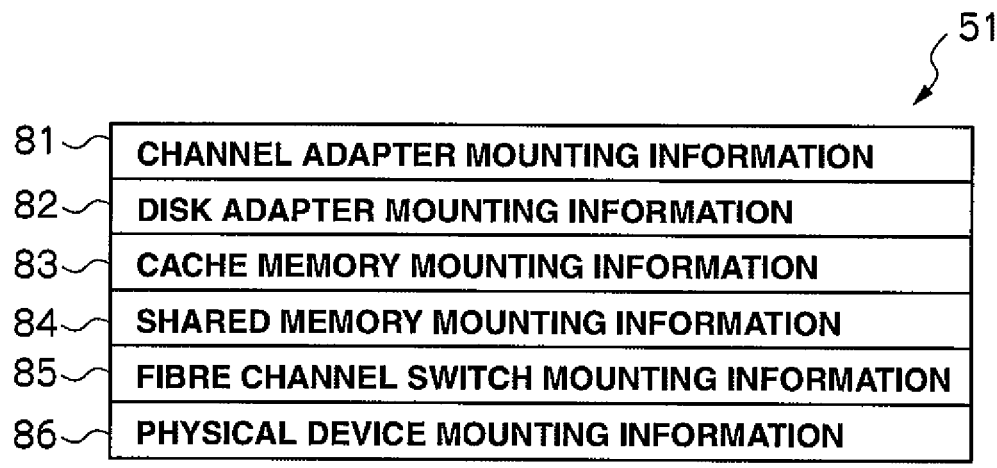
FIG. 4 is a conceptual diagram explaining the mounting information table.

FIG. 4 shows the configuration of a mounting information table 51. The mounting information table 51 stores information on various constituent elements loaded in the storage apparatus 3. The mounting information table 51 stores channel adapter mounting information 81 for storing information on each of the mounted channel adapters 21, disk adapter mounting information 82 for storing information on each of the mounted disk adapters 22, cache memory mounting information 83 for storing information on the mounted cache memory 23, shared memory mounting information 84 for storing information on the mounted shared memory 24, fibre channel switch mounting information 85 for storing information on the mounted fibre channel switch 31, and physical device mounting information 86 for storing information on the mounted physical device 32.

The channel adapter mounting information 81, for instance, stores information such as the package type of each mounted channel adapter 21, number of ports 21A and number of CPUs. The channel adapter mounting information 82, for instance, stores information such as the package type of each mounted disk adapter 22, number of ports 22A and number of CPUs. The cache memory mounting information 83, for instance, stores information such as the package type and capacity of each mounted cache memory 23. The shared memory mounting information 84, for instance, stores information such as the package type and capacity of each mounted shared memory 24.

Figure 5:
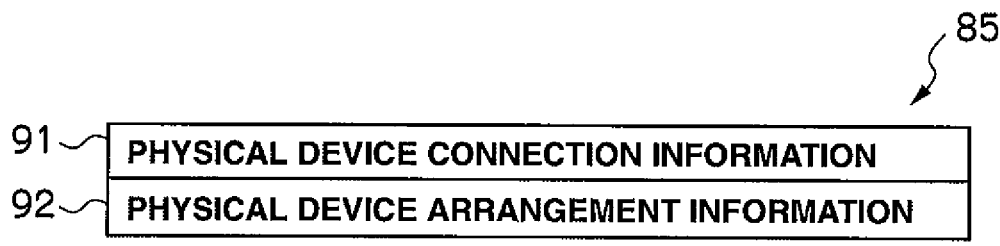
FIG. 5 is a conceptual diagram explaining the fibre channel switch mounting information.

FIG. 5 shows the fibre channel switch mounting information 85. The fibre channel switch mounting information 85 stores physical device connection information 91 for storing information such as the total number and position of the physical device 32 connected to the fibre channel switch 31 and physical device arrangement information 92 for storing information such as the arrangement order, arrangement position and arrangement method of the physical device 32.

Figure 6:
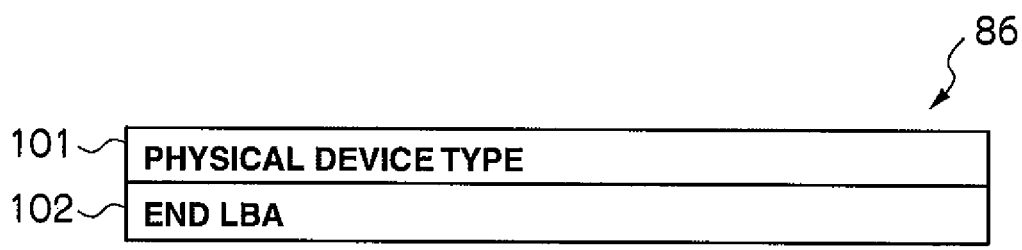
FIG. 6 is a conceptual diagram explaining the physical device mounting information.

FIG. 6 shows the physical device mounting information 86. The physical device mounting information 86 stores, for each physical device 32 connected to the fibre channel switch 31, a physical device type 101 for storing information such as the model type and capacity, and an end LBA 102 for storing the final LBA of the physical device 32.

Figure 7:
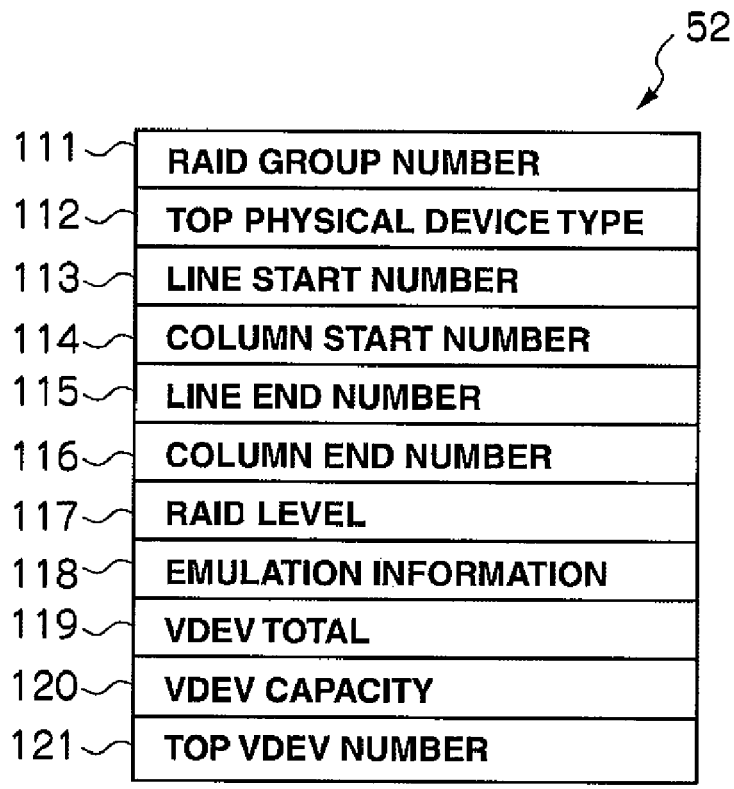
FIG. 7 is a conceptual diagram explaining the RAID group information table.

FIG. 7 shows the configuration of a RAID group information table 52. The RAID group information table 52 stores information on the RAID group 41 configured from a plurality of physical devices 32. RAID group information table 52 stores, for each RAID group 41, a RAID group number 111, a top physical device type 112, a line start number 113, a column start number 114, a line end number 115, a column end number 116, a RAID level 117, an emulation information 118, a VDEV total 119, a VDEV capacity 120 and a top VDEV number 121.

The RAID group number 111 stores an identifier for uniquely recognizing the RAID group 41. The top physical device type 112 stores a type of physical device 32 to become the top of the RAID group 41. The line start number 113 stores a start number on the line side of the physical device position information table 60 in the RAID group 41. The column start number 114 stores a start number on the column side of the physical device position information table 60 in the RAID group 41. The line end number 115 stores an end number on the line side of the physical device position information table 60 in the RAID group 41. The column end number 116 stores an end number on the column side of the physical device position information table 60 in the RAID group 41. The RAID level 117 stores, for instance, a RAID level of the RAID group 41 such as RAID 1, RAID 5 or the like. The emulation information 118 stores, for instance, information on the emulation type of the VDEV 42 such as the open system and mainframe system. The VDEV total 119 stores the total number of VDEVs 42 in the RAID group 41. The VDEV capacity 120 stores the capacity of the VDEV 42 in the RAID group 41. The top VDEV number 121 stores the VDEV number of the VDEV 42 to become the top in the RAID group 41.

Figure 8:
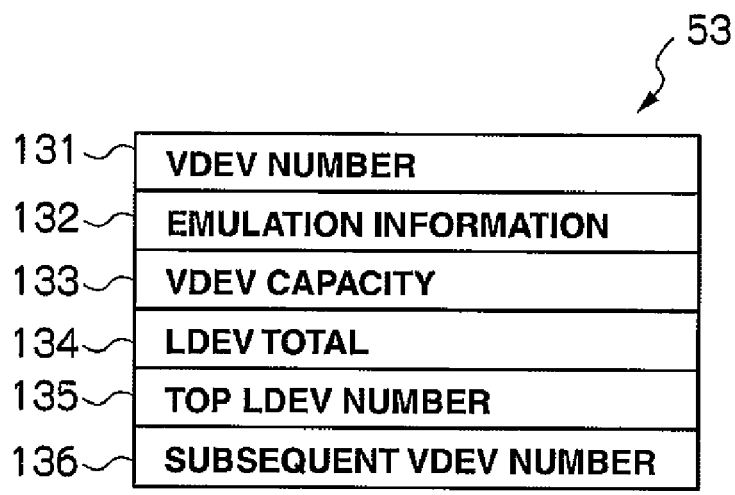
FIG. 8 is a conceptual diagram explaining the VDEV information table.

FIG. 8 shows the configuration of a VDEV information table 53. The VDEV information table 53 stores information on the VDEV 42 formed from an address space of the RAID group 41. The VDEV information table 53 stores, for each VDEV 42, a VDEV number 131 for storing an identifier that uniquely identifies the VDEV 42, emulation information 132 for storing information on the emulation type of the VDEV 42, VDEV capacity 133 for storing information on the capacity of the VDEV 42, a LDEV total 134 for storing the total number of LDEVs 43 in the VDEV 42, a top LDEV number 135 for storing the LDEV number of the LDEV 43 to become the top in the VDEV 42, and a subsequent VDEV number 136 for storing a subsequent VDEV number of the VDEV number 131 in the RAID group 41.

FIG. 9 shows the configuration of a LDEV information table 54. The LDEV information table 54 stores information on the LDEV 43 configured by dividing the VDEV 42. The LDEV information table 54 stores, for each LDEV 43, a LDEV number 141 for storing an identifier that uniquely identifies the LDEV 43, emulation information 142 for storing information on the emulation type of the LDEV 43, LDEV capacity 143 for storing information on the capacity of the LDEV 43, original VDEV number 144 for storing the VDEV number of the VDEV 42 to become the division source of the LDEV 43, and subsequent LDEV number 145 for storing a subsequent LDEV number of the LDEV number 141 in the VDEV 42.

FIG. 10 shows the configuration of a channel adapter configuration information table 55. The channel adapter configuration information table 55 collectively stores information relating to the configuration of the channel adapter 21. The channel adapter configuration information table 55 stores, for each channel adapter 21, connection channel type information 151 of the channel adapter port information table, package mounting information 152 of the resource mounting information table, processor mounting information 153 of the resource mounting information table, port mounting information 154 of the resource mounting information table, package status 155 of the resource status information table, processor status 156 of the resource status information table, port status 157 of the resource status information table, operational option information 158 of the system option information table, port type 159 of the resource status information table, port channel speed 160 of the channel adapter port information table and emulation information 161 of the DKC-specific information table.

The connection channel type information 151 of the channel adapter port information table stores information on the channel type of the port 21A of the channel adapter 21 stored in the channel adapter port information table 66. The package mounting information 152 of the resource mounting information table stores information on the package of the channel adapter 21 stored in the resource mounting information table 63. The processor mounting information 153 of the resource mounting information table stores information on the respective processors of the channel adapter 21 stored in the resource mounting information table 63. The port mounting information 154 of the resource mounting information table stores information of the respective ports 21A of the channel adapter 21 stored in the resource mounting information table 63.

The package status 155 of the resource status information table stores the status of the package of the channel adapter 21 stored in the resource status information table 64. The processor status 156 of the resource status information table stores the status of the respective processors of the channel adapter 21 stored in the resource status information table 64. The port status 157 of the resource status information table stores the status of the respective ports 21A stored in the resource status information table 64. The operational option information 158 of the system option information table stores information on the operational option of the channel adapter 21 stored in the system option information table 65. The port type 159 of the resource status information table stores the type of the respective ports 21A of the channel adapter 21 stored in the resource status information table 64. The port channel speed 160 of the channel adapter port information table stores information on the channel speed of the respective ports 21A of the channel adapter 21 stored in the channel adapter port information table 6. The emulation information 161 of the DKC-specific information table stores information on the emulation type of the disk controller 11 stored in the DKC-specific information table 67.

Figure 11:
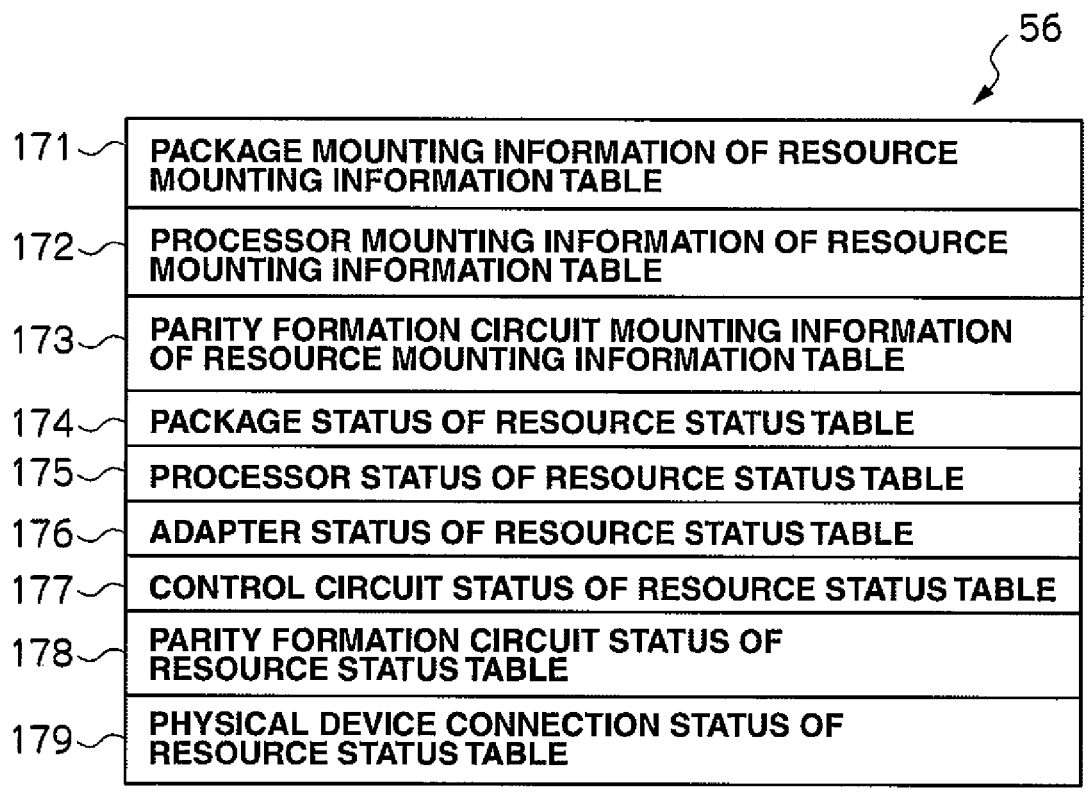
FIG. 11 is a conceptual diagram explaining the disk adapter configuration information table.

FIG. 11 shows the configuration of a disk adapter configuration information table 56. The disk adapter configuration information table 56 collectively stores information relating to the configuration of the disk adapter 22. The disk adapter configuration information table 56 stores, for each disk adapter 22, package mounting information 171 of the resource mounting information table, processor mounting information 172 of the resource mounting information table, parity forming circuit mounting information 173 of the resource mounting information table, package status 174 of the resource status information table, processor status 175 of the resource status information table, adapter status 176 of the resource status information table, control circuit status 177 of the resource status information table, parity forming circuit status 178 of the resource status information table, and physical device connection status 179 of the resource status information table.

The package mounting information 171 of the resource mounting information table stores information on the package of the disk adapter stored in the resource mounting information table 63. The processor mounting information 172 of the resource mounting information table stores information on the respective processors of the disk adapter 22 stored in the resource mounting information table 63. The parity forming circuit mounting information 173 of the resource mounting information table stores information on the respective parity forming circuits of the disk adapter 22 stored in the resource mounting information table 63.

The package status 174 of the resource status information table stores information on the status of the package of the disk adapter 22 stored in the resource status information table 64. The processor status 175 of the resource status information table stores information on the status of the respective processors of the disk adapter 22 stored in the resource status information table 64. The adapter status 176 of the resource status information table stores information on the status of the respective adapter statuses of the disk adapter 22 stored in the resource status information table 64. The control circuit status 177 of the resource status information table stores information on the status of the respective control circuits of the disk adapter 22 stored in the resource status information table 64. The parity forming circuit status 178 of the resource status information table stores information on the status of the respective parity forming circuits of the disk adapter 22 stored in the resource status information table 64. The physical device connection status 179 of the resource status information table stores information on the status of the respective physical devices 32 connected to the disk adapter 22 stored in the resource status information table 64.

FIG. 12 shows the configuration of a cache memory configuration information table 57. The cache memory configuration information table 57 collectively stores information relating to the configuration of the cache memory 23. The cache memory configuration information table 57 stores, for each cache memory 23, capacity information 181 of the tuning information table, module information 182 of the resource mounting information table, package information 183 of the resource mounting information table, cache memory status information 184 in cluster units of the resource mounting information table, module quantity 185 of the cache memory of the resource status information table, module status 186 of the resource status information table, package status 187 of the resource status information table, cache memory status 188 in cluster units of the resource status information table, and resident extent upper limit information 189 for each cache logical partition of the tuning information table.

The capacity information 181 of the tuning information table stores information on the capacity of the cache memory 23 stored in the tuning information table 62. The module information 182 of the resource mounting information table stores information on the module of the cache memory 23 stored in the resource mounting information table 63. The package information 183 of the resource mounting information table stores information on the package of the cache memory 23 stored in the resource mounting information table 63. The cache memory status information 184 in cluster units of the resource mounting information table stores information regarding whether there is a cache memory 23 in cluster units stored in the resource mounting information table 63.

The module quantity 185 of the cache memory of the resource status information table stores information on the status of the module quantity of the cache memory 23 stored in the resource status information table 64. The module status 186 of the resource status information table stores information on the status of the module of the cache memory 23 stored in the resource status information table 64. The package status 187 of the resource status information table stores information of the status of the package of the cache memory 23 stored in the resource status information table 64. The cache memory status 188 in cluster units of the resource status information table stores information on whether there is a cache memory 23 in cluster units stored in the resource status information table 64. The resident extent upper limit information 189 for each cache logical partition of the tuning information table stores information on the upper limit of the extent enabling the residence of data for each cache logical partition stored in the tuning information table 62.

FIG. 13 shows the configuration of a shared memory configuration information table 58. The shared memory configuration information table 58 collectively stores information relating to the configuration of the shared memory 24. The shared memory configuration information table 58 stores, for each shared memory 24, capacity information 191 of the tuning information table, module information 192 of the resource mounting information table, package information 193 of the resource mounting information table, cache memory status information 194 in cluster units of the resource mounting information table, module quantity 195 of the cache memory of the resource status information table, module status 196 of the resource status information table, package status 197 of the resource status information table, and cache memory status 198 in cluster units of the resource status information table.

The capacity information 191 of the tuning information table stores information on the capacity of the shared memory 24 stored in the tuning information table 62. The module information 192 of the resource mounting information table stores information on the module of the shared memory stored in the resource mounting information table 63. The package information 193 of the resource mounting information table stores information on the package of the shared memory 24 stored in the resource mounting information table 63. The shared memory status information 194 in cluster units of the resource mounting information table stores information regarding whether there is a shared memory 24 in cluster units stored in the resource mounting information table 63.

The module quantity 195 of the shared memory of the resource status information table stores information on the status of the module quantity of the share memory 24 stored in the resource status information table 64. The module status 196 of the resource status information table stores information on the status of the module of the shared memory 24 stored in the resource status information table 64. The package status 197 of the resource status information table stores information on the status of the package of the shared memory 24 stored in the resource status information table 64. The shared memory status 198 in cluster units of the resource status information table stores information regarding whether there is a shared memory 24 in cluster units stored in the resource status information table 64.

The device configuration information table 59 collectively stores information relating to the configuration of the physical device 32, the RAID group 41, the VDEV 42 and the LDEV 43. The device configuration information table 59 stores information on the emulation type, capacity and so on of the LDEV 43.

Figure 14:
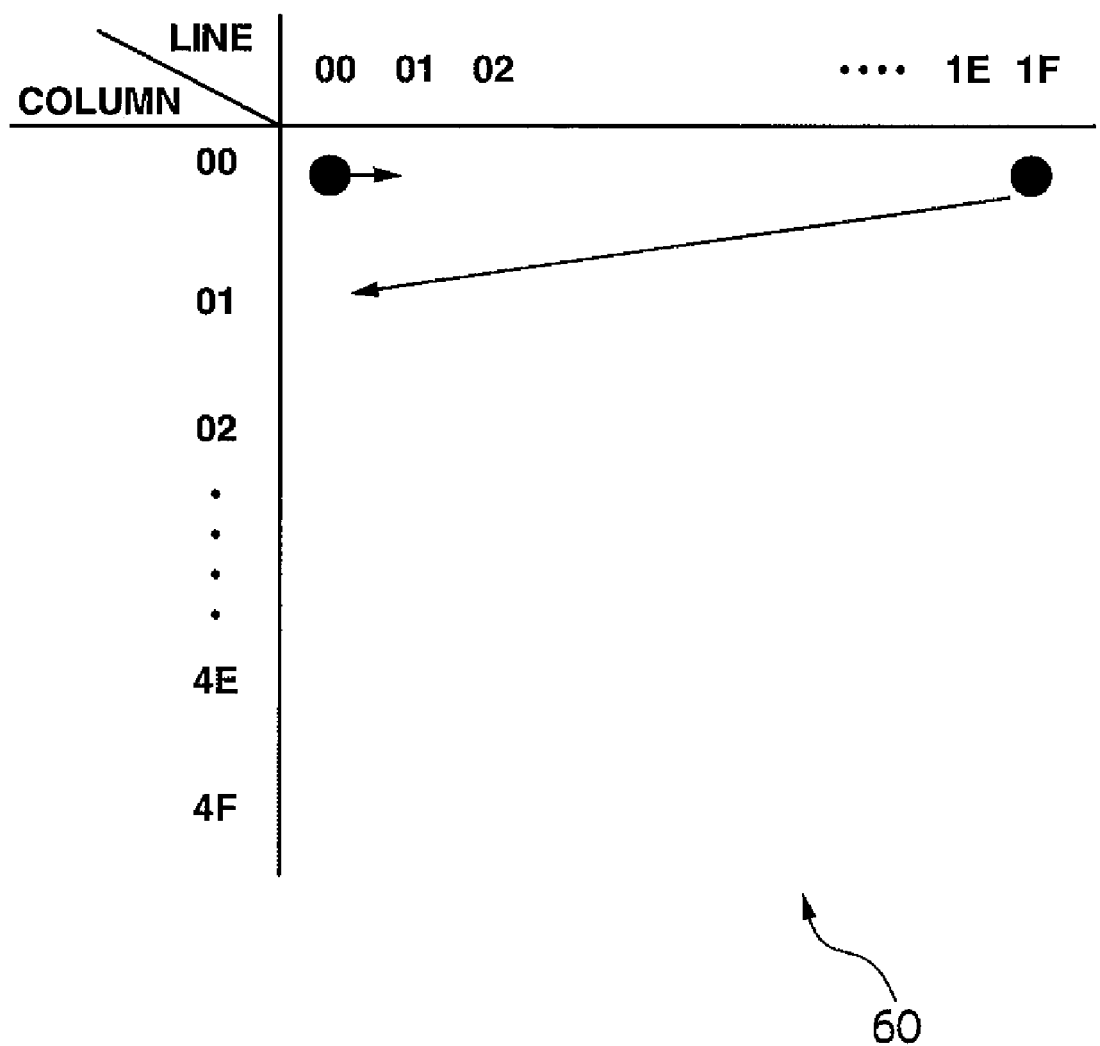
FIG. 14 is a conceptual diagram explaining the physical device position information table.

FIG. 14 shows the configuration of a physical device position information table 60. The physical device position information table 60 is a table representing the arrangement order and arrangement position of the physical device 32 in lines and columns based on the physical device arrangement information 92 of the fibre channel switch mounting information 85 for each unit capable of configuring the RAID group 41 (i.e., for each physical device 32 of a different fibre channel switch 31). The physical device position information table 60 is used upon configuring the RAID group 41.

FIG. 15 shows the configuration of a RAID group compatibility index table 61. The RAID group compatibility index table 61 is used for detecting identical or compatible physical devices 32 upon setting the RAID group. The RAID group compatibility index table 61 represents an index format of lines and columns for each type of physical device 32. For example, FIG. 15 shows a RAID group compatibility index table 61 when 7 types of physical devices 32 (A to G) exist in the storage apparatus 3. Here, the RAID group compatibility index table 61 is created from the respective elements of A to G in the lines and columns, and a bit (1) is provided to devices that are identical or compatible. For instance, the physical device 32 of A is compatible with E and F. The RAID group compatibility index table 61 is used upon configuring the RAID group 41.

Figure 16:
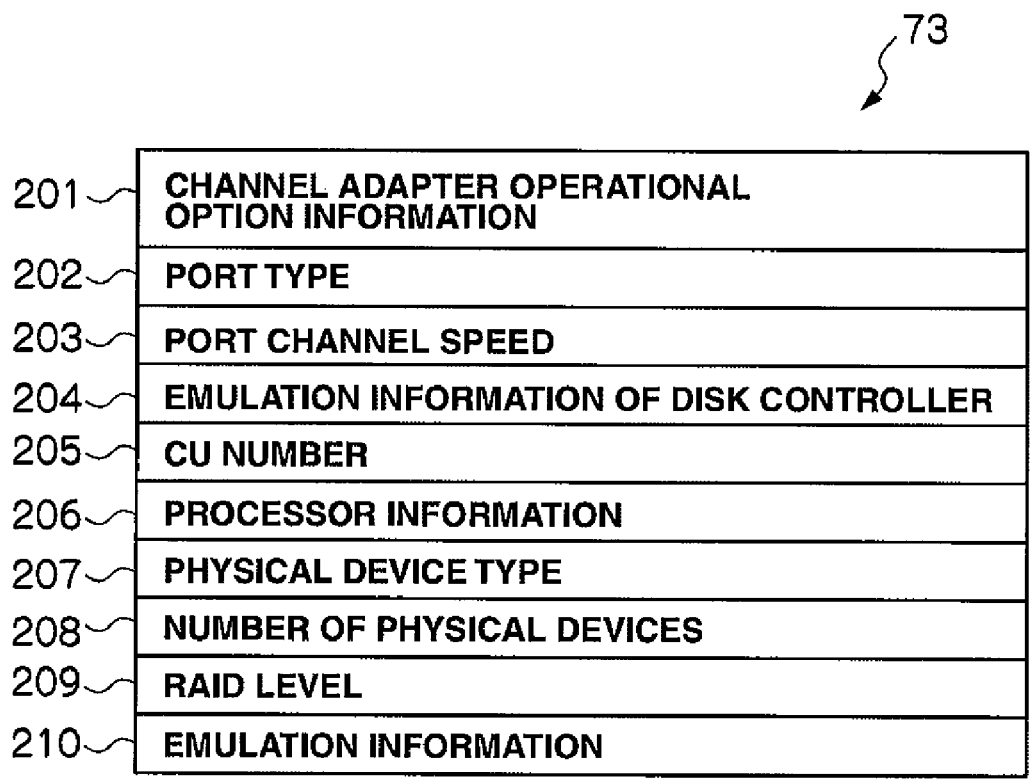
FIG. 16 is a conceptual diagram explaining the policy file.

FIG. 16 shows the table configuration of a policy file 73. The policy file 73 lists various matters, which were conventionally set by the administrator by operating the storage apparatus 3, as parameters in advance. The policy file 73 stores channel adapter operational option information 201, port type 202, port channel speed 203, disk controller emulation information 204, CU number 205, processor information 206, physical device type 207, physical device quantity 208, RAID level 209 and emulation configuration information 210.

The channel adapter operational option information 201 stores information on the operational option of the channel adapter 21. The port type 202 stores the type of the respective ports 21A of the channel adapter 21. The port channel speed 203 stores information on the channel speed of the respective ports 21A of the channel adapter 21. The disk controller emulation information 204 stores information on the emulation type of the disk controller 11. The CU number 205 stores information on the offset value of the physical device 32 to be allocated to the port. The processor information 206 stores information on the respective processors of the channel adapter 21 and the disk adapter 22. The physical device type 207 stores information on the model type, capacity and so on.

Figure 17:
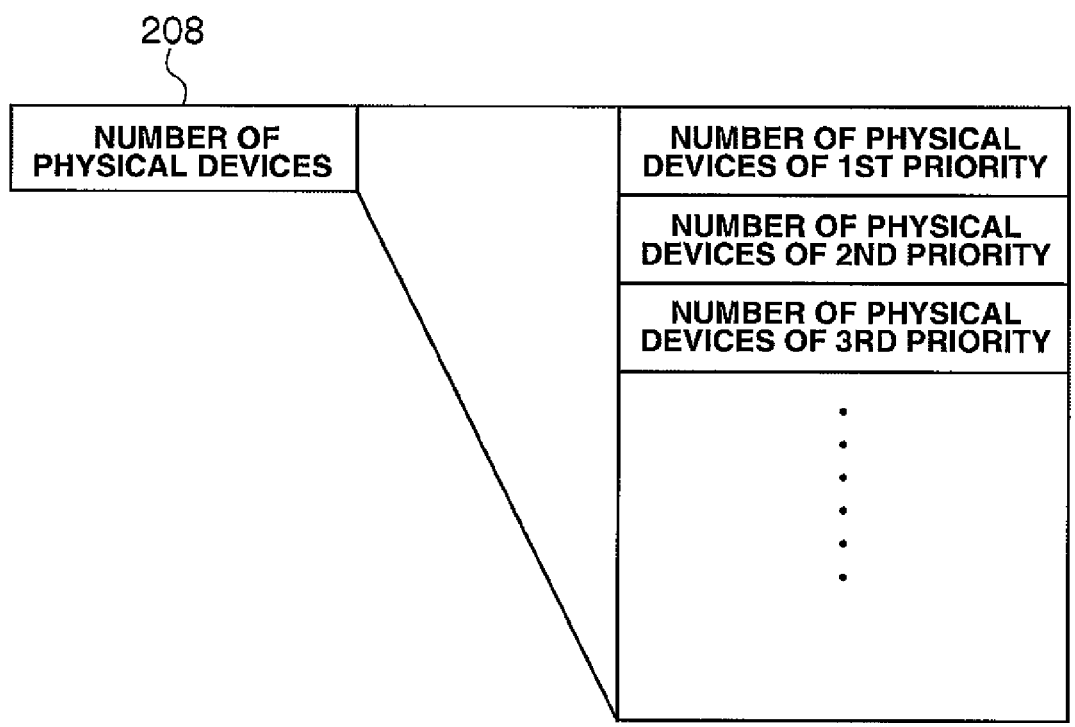
FIG. 17 is a conceptual diagram explaining the policy file.

FIG. 17 shows the detailed configuration of a physical device quantity 208. The physical device quantity 208 stores information on the number of physical devices 32 in the order of priority to be set by the administrator operating the storage apparatus 3. For instance, since a RAID group 41 with a larger capacity can be configured with a greater number of physical devices, the policy file 73 can list, for instance, 16 as the quantity of physical devices having the first priority, 8 as the quantity of physical devices having the second priority, and so on.

Figure 18:
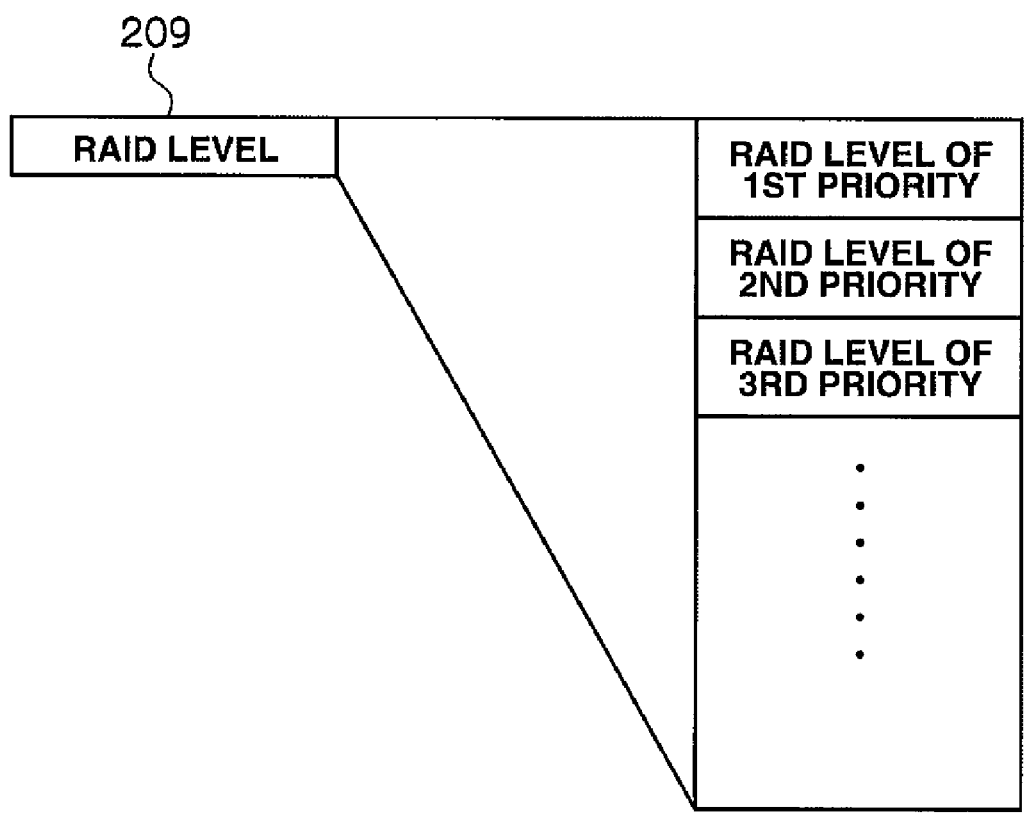
FIG. 18 is a conceptual diagram explaining the policy file.

FIG. 18 shows the detailed configuration of a RAID level 209. The RAID level 209 stores information on the RAID level in the order of priority to be set by the administrator operating the storage apparatus 3. For instance, when emphasizing capacity, the priority of RAID 5 (7D+1P) is listed high in the policy file 73, when emphasizing reliability, the priority of RAID 6 (6D+2P) is listed high in the policy file 73, and when emphasizing performance, the priority of RAID 1 (4D+ 4D) is listed high in the policy file 73.

Figure 19:
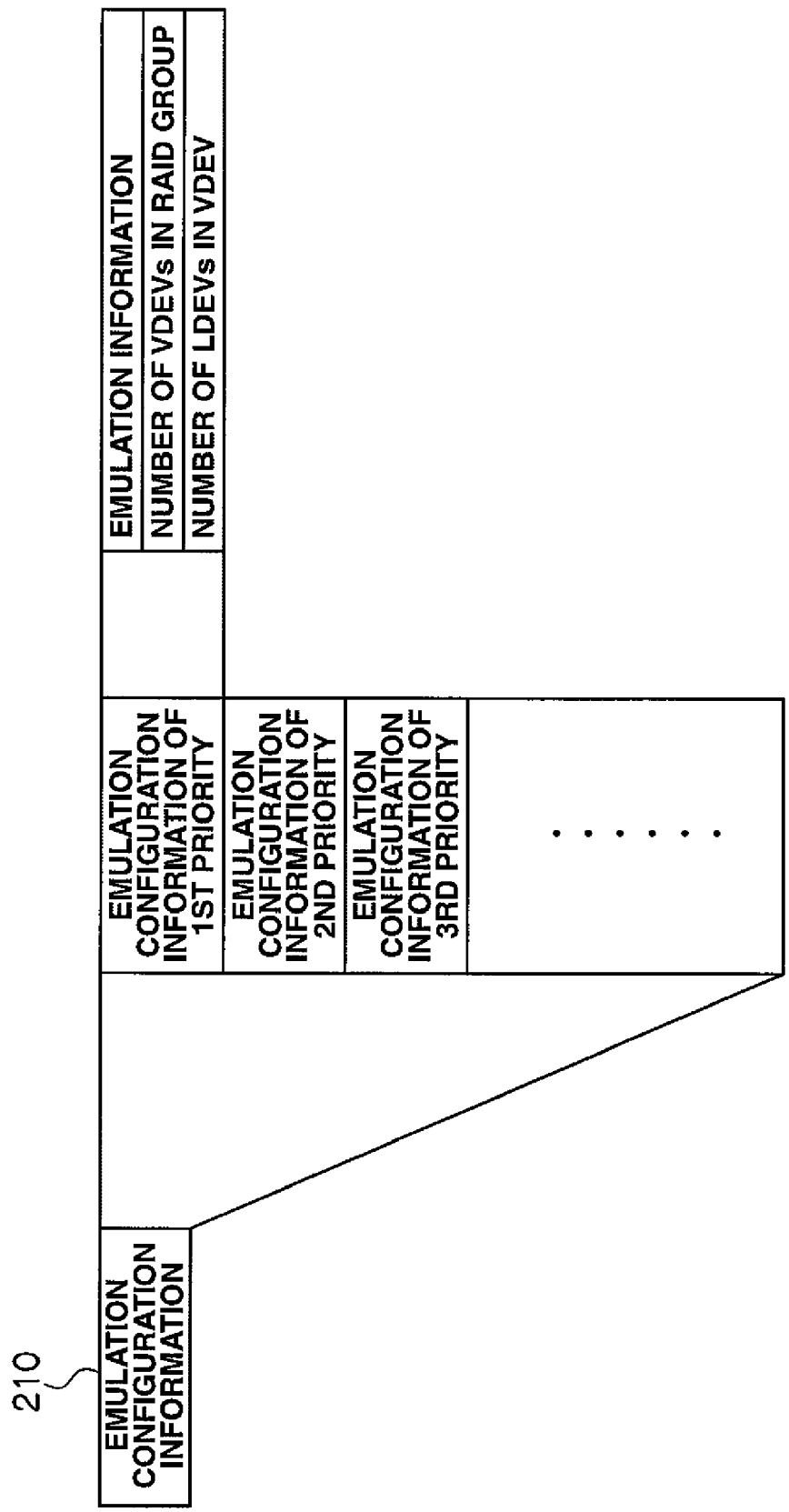
FIG. 19 is a conceptual diagram explaining the policy file.

FIG. 19 shows the detailed configuration of emulation configuration information 210. The emulation configuration information 210 stores the emulation type in the order of priority to be set by the administrator operating the storage apparatus 3, and other information. The emulation configuration information of each priority stores emulation information, number of VDEVs in the RAID group, and number of LDEVs in the VDEV. For example, the priority of the emulation configuration information of the emulation type to be used can be listed high in the policy file 73.

Figure 20:
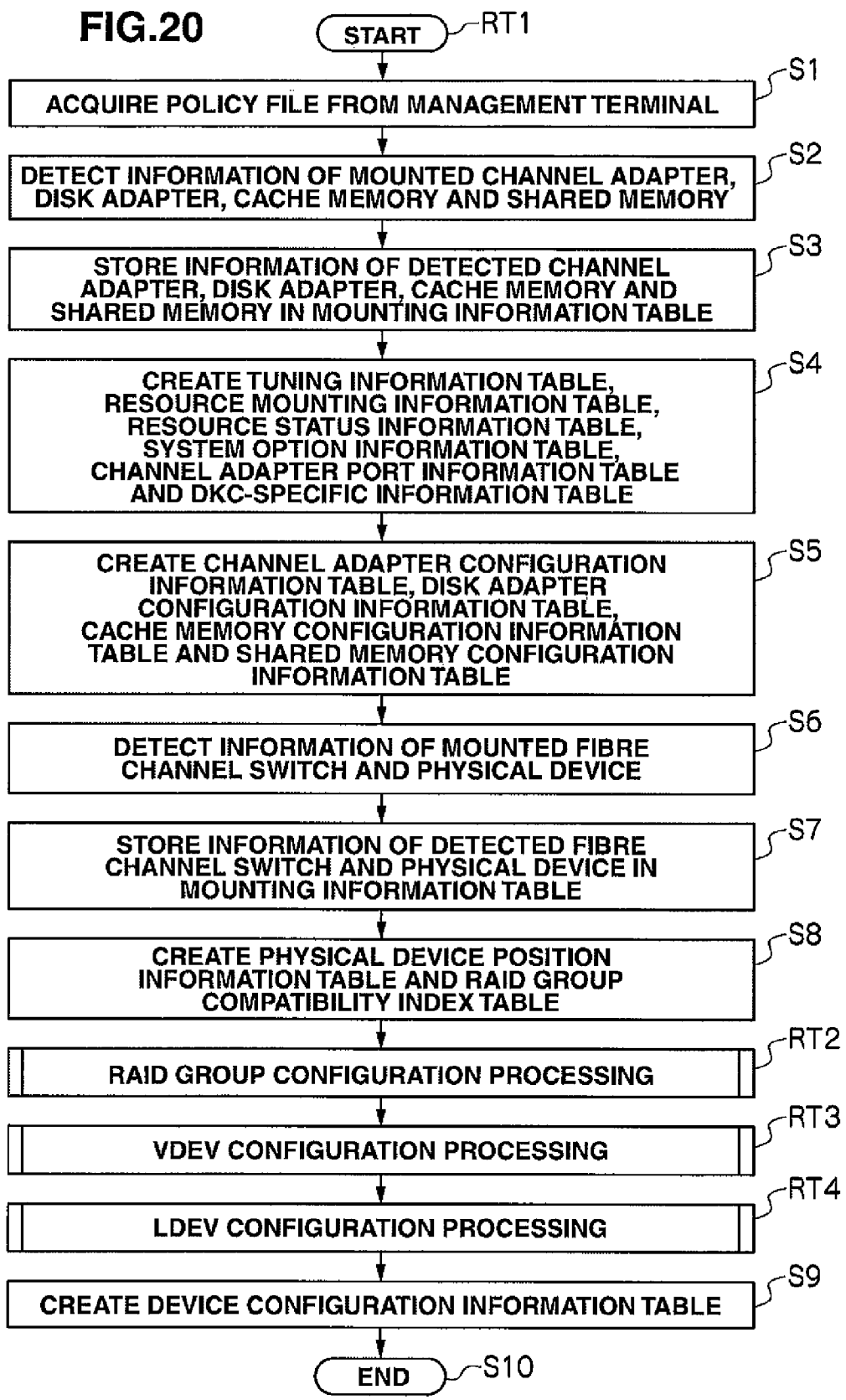
FIG. 20 is a flowchart showing the configuration information setting processing routine.

Configuration information configuration processing in the storage system 1 is now explained. FIG. 20 is a flowchart showing the specific processing routine of the channel adapter 21 of the storage apparatus 3 concerning the configuration information setting processing in the storage system 1.

Among the channel adapters 21 of the storage apparatus 3, by a prescribed channel adapter 21 executing the configuration information setting processing program 74 for setting various types of configuration information when the storage apparatus 3 is initially activated or activated after a reboot, it acquires the policy file 73 from the management terminal 25 according to the configuration information setting processing routine RT1 shown in FIG. 20 (S1), and stores such policy file 73 in the shared memory 24.

Subsequently, the channel adapter 21 detects information on the channel adapter 21, the disk adapter 22, the cache memory 23 and the shared memory 24 mounted on the storage apparatus 3 (S2). For example, by communicating with the disk adapter 22, the channel adapter 21 detects such disk adapter 22 and acquires information.

Then, the channel adapter 21 stores the information on the detected channel adapter 21, the disk adapter 22, the cache memory 23 and the shared memory 24 in the mounting information table 51 (S3).

The channel adapter 21 thereafter creates a tuning information table 62, a resource mounting information table 63, a resource status information table 64, a system option information table 65, a channel adapter port information table 66 and a DKC-specific information table 67 based on information of the channel adapter 21, the disk adapter 22, the cache memory 23 and the shared memory 24 stored in the mounting information table 51, and information listed in the policy file 73 (S4).

For example, the channel adapter 21 creates the DKC-specific information table 67 by acquiring the emulation information 204 of the disk controller of the policy file 73 and storing other prescribed information.

Subsequently, the channel adapter 21 creates the channel adapter configuration information table 55, the disk adapter configuration information table 56, the cache memory configuration information table 57 and the shared memory configuration information table 58 based on the information of the channel adapter 21, the disk adapter 22, the cache memory 23 and the shared memory 24 stored in the mounting information table 51, information listed in the policy file 73, and the information stored in the tuning information table 62, the resource mounting information table 63, the resource status information table 64, the system option information table 65, the channel adapter port information table 66 and the DKC-specific information table 67 (S5).

For instance, the channel adapter 21 creates the channel adapter configuration information table 55 by storing the processor mounting information stored in the resource mounting information table 63, and the emulation information stored in the DKC-specific information table 67.

Then, the channel adapter 21 detects the information of the fibre channel switch 31 and the physical device 3 mounted on the storage apparatus 3 (S6).

The channel adapter 21 thereafter stores the detected information of the fibre channel switch 31 and the physical device 32 (S7).

Further, the channel adapter 21 creates the physical device position information table 60 and the RAID group compatibility index table 61 based on the fibre channel switch mounting information 85 and the physical device mounting information 86 stored in the mounting information table 51, and the information listed in the policy file 73 (S8).

Here, the channel adapter 21 creates the physical device position information table 60 by storing the physical device connection information 91 and the physical device arrangement information 92 of the fibre channel switch mounting information 85 in the corresponding lines and columns. Further, the channel adapter 21 creates the RAID group compatibility index table 61 by checking the compatibility of all physical device types 101 of the physical device mounting information 86.

Subsequently, the channel adapter 21 executes the RAID group configuration processing (RT2), and creates the RAID group information table 52. Then, the channel adapter 21 executes the VDEV configuration processing (RT3), and creates the VDEV information table 53. The channel adapter 21 thereafter executes the LDEV configuration processing (RT4), and creates the LDEV information table 54.

Further, the channel adapter 21 creates the device configuration information table 59 based on the information of the fibre channel switch 31 and the physical device 32 stored in the mounting information table 51, information listed in the policy file 73, and the information stored in the RAID group information table 52, the VDEV information table 53 and the LDEV information table 54 (S9). Eventually, the channel adapter 21 ends the configuration information setting processing routine RT1 shown in FIG. 20 (S10).

Figure 21:
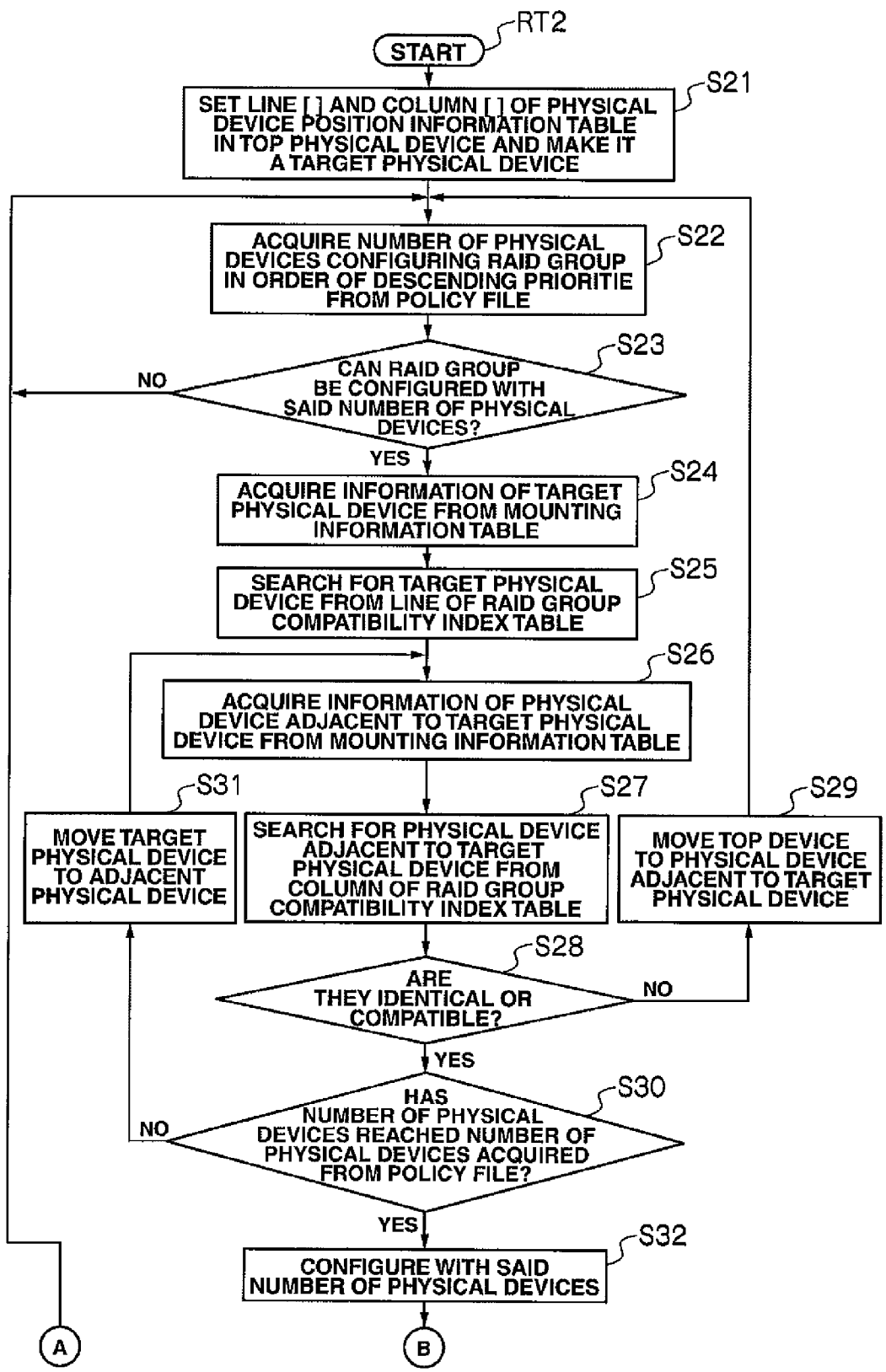
FIG. 21 is a flowchart showing the RAID group configuration processing routine.
Figure 22:
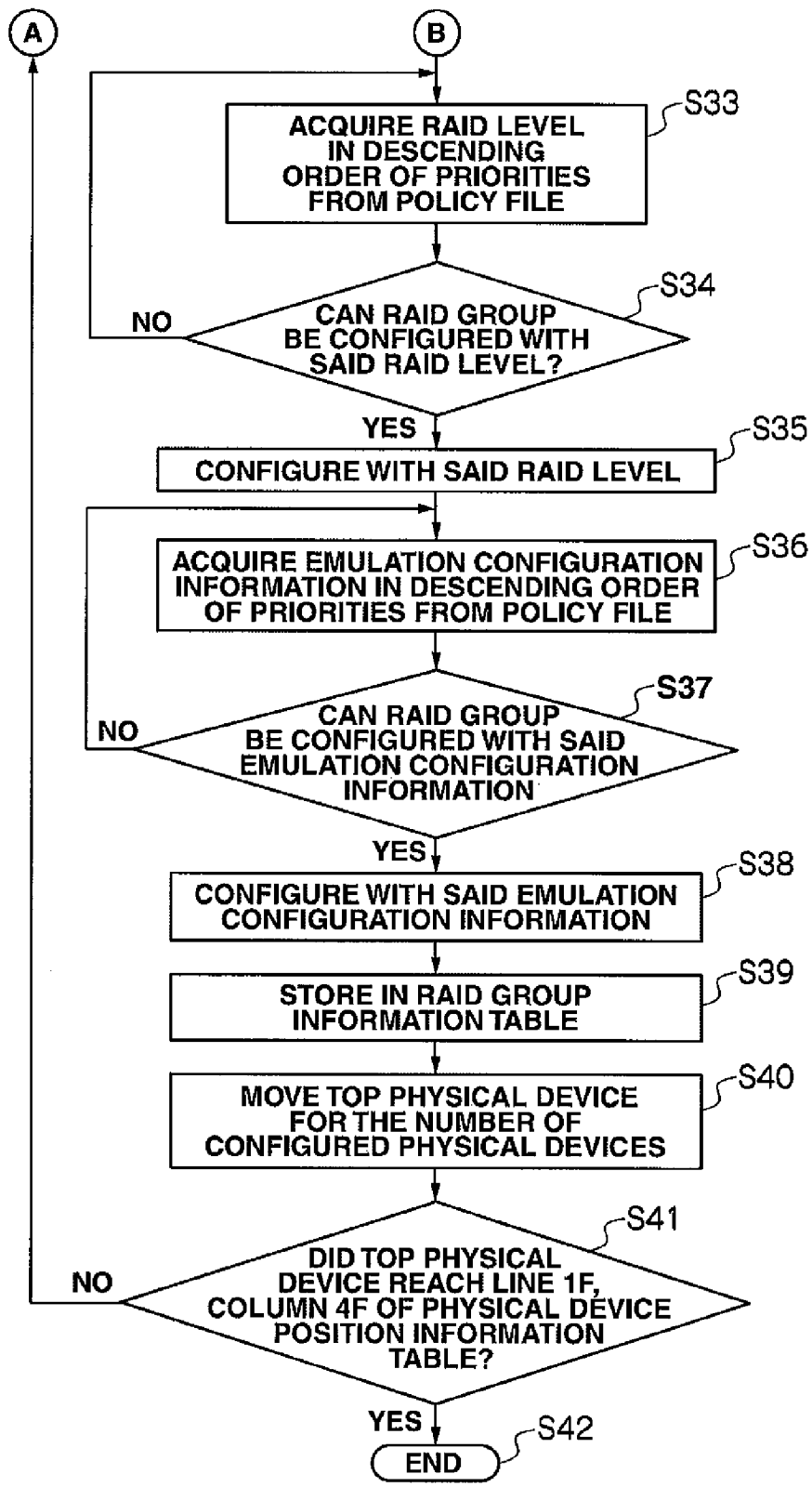
FIG. 22 is a flowchart showing the RAID group configuration processing routine.

RAID group configuration processing in the storage system 1 is now explained. FIG. 21 and FIG. 22 are flowcharts showing the specific processing routine of the channel adapter 21 in the storage apparatus 3 relating to the RAID group configuration processing in the storage system 1.

When the channel adapter 21 creates the physical device position information table 60 and the RAID group compatibility index table 61, by executing the RAID group configuration processing program 75 for configuring the RAID group 41, it sets line 00 and column 00 of the physical device position information table 60 in the physical device 32, which is the top physical device, configuring the RAID group 41 according to the RAID group configuration processing routine RT2 shown in FIG. 21 and FIG. 22, and makes such top physical device a target physical device (S21).

Subsequently, the channel adapter 21 acquires, from the policy file 73, the physical device quantity 208 in descending order from the physical device quantity of the first priority 1 (S22). Then, channel adapter 21 checks whether the position of the lines and columns of the physical device position information table 60 is able to configure the RAID group 41 with the physical device quantity 208 acquired from the policy file 73 (S23).

Here, in the physical device position information table 60, for instance, the position of the lines and columns of the top physical device capable of configuring the RAID group 41 with 16 devices is determined in line 00 and line 10, the position of the lines and columns of the top physical device capable of configuring the RAID group 41 with 8 devices is determined in line 00, line 08, line 10 and line 18, and the position of the lines and columns of the top physical device capable of configuring the RAID group 41 with 4 devices is determined in line 00, line 04, line 08, line 0C, line 10, line 14, line 18 and line 1C.

Accordingly, in the physical device position information table 60, depending on the position of the lines and columns, there may be cases where it is not possible to create the RAID group 41 with the physical device quantity 208 acquired from policy file 73.

Thus, when it is not possible to configure the RAID group 41 with the physical device quantity 208 acquired from policy file 73 (S23: NO), the channel adapter 21 returns to step S22, acquires the physical device quantity 208 of the subsequent priority from the policy file 73, and then repeats the same processing (S22, S23).

Contrarily, when it is possible to configure the RAID group 41 with the physical device quantity 208 acquired from policy file 73 (S23: YES), the channel adapter 21 acquires information on the target physical device from the mounting information table 51 (S24).

Subsequently, the channel adapter 21 searches for the physical device type 101 stored in the mounting information table 51 corresponding to the target physical device from the lines of the RAID group compatibility index table 61 (S25).

Then, the channel adapter 21 acquires information on the physical device adjacent to the target physical device in the physical device position information table 60 from the mounting information table 51 (S26). Incidentally, in the physical device position information table 60, this means that the physical device is adjacent to the line direction of the adjacent physical device, and to move to the adjacent physical device means to move to the physical device adjacent in the line direction. Incidentally, when the target physical device is to move to the physical device adjacent to the physical device of line 1F of the physical device position information table 60, it will be moved to the physical device of line 00 in one column below.

The channel adapter 21 thereafter searches for the physical device type 101 stored in the mounting information table 51 corresponding to the physical device adjacent to the target physical device from the columns of the RAID group compatibility index table 61 (S27).

Subsequently, the channel adapter 21 checks whether the physical device type 101 stored in the mounting information table 51 corresponding to the target physical device and the physical device type 101 stored in the mounting information table 51 corresponding to the physical device adjacent to the target physical device are identical or compatible (S28).

Specifically, the channel adapter 21 determines where a bit (1) is provided at the intersecting position of the line of the RAID group compatibility index table 61 corresponding to the target physical device, and the column of the RAID group compatibility index table 61 corresponding to the physical device adjacent to the target physical device.

When the physical device type 101 stored in the mounting information table 51 corresponding to the target physical device and the physical device type 101 stored in the mounting information table 51 corresponding to the physical device adjacent to the target physical device are not identical or compatible (S28: NO), the channel adapter 21 moves the top physical device to the adjacent physical device (S29), thereafter returns once again to step S22 for acquiring, from the policy file 73, the physical device quantity 208 in order from the physical device quantity of the first priority, and then repeats the same processing (S22 to S29).

In addition, the channel adapter 21 checks whether the physical device quantity from the top physical device to the target physical device reached the physical device quantity acquired from the policy file 73 (S30).

When the physical device quantity from the top physical device to the target physical device has not reached the physical device quantity acquired from the policy file 73 (S30: NO), the channel adapter 21 thereafter returns once again to step S26 for acquiring information on the physical device adjacent to the target physical device in the physical device position information table 60 from the mounting information table 51, and then repeats the same processing (S26 to S29).

Contrarily, when the physical device quantity from the top physical device to the target physical device reached the physical device quantity acquired from the policy file 73 (S30: YES), the channel adapter 21 configures the physical device quantity with the foregoing physical device quantity (S32).

Subsequently, the channel adapter 21 acquires the RAID level 209 from the policy file 73 in order from the RAID level of the first priority (S33). Then, the channel adapter 21 checks whether it is possible to configure the RAID group 41 with the RAID level 209 acquired from the policy file 73 (S34).

When it is not possible to configure the RAID group 41 with the RAID level 209 acquired from the policy file 73 (S34: NO), the channel adapter 21 returns to step S33, acquires the RAID level 209 of the subsequent priority from the policy file 73, and then repeats the same processing (S33, S34).

Contrarily, when it is possible to configure the RAID group 41 with the RAID level 209 acquired from the policy file 73 (S34: YES), the channel adapter 21 configures the RAID level with the foregoing RAID level (S35).

Subsequently, the channel adapter 21 acquires the emulation configuration information 210 from the policy file 73 in order from the emulation configuration information of the first priority (S36). Then, the channel adapter 21 checks whether it is possible to configure the RAID group 41 with the emulation configuration information 210 acquired from policy file 73 (S37).

When it is not possible to configure the RAID group 41 with the emulation configuration information 210 acquired from policy file 73 (S37: NO), the channel adapter 21 returns to step S36, acquires the emulation configuration information 210 of the subsequent priority from the policy file 73, and then repeats the same processing (S36, S37).

Contrarily, when it is possible to configure the RAID group 41 with the emulation configuration information 210 acquired from policy file 73 (S37: YES), the channel adapter 21 configures the emulation configuration information with the foregoing emulation configuration information (S38).

The channel adapter 21 thereafter sets the RAID group number, sets the top physical device type from the top physical device, sets the line start number and the column start number from the position of the lines and columns in the physical device position information table 60 of the top physical device, sets the line end number and the column end number from the position of the lines and columns in the physical device position information table 60 of the top physical device and the set physical device quantity, and stores these in the RAID group information table 52 together with the RAID level and the emulation information (S39).

Subsequently, the channel adapter 21 moves the top physical device in the amount of the set physical device quantity (S40). Then, the channel adapter 21 checks whether the top physical device reached line 1F, column 4F in the physical device position information table 60 (S41).

When the top physical device has not reached line 1F, column 4F in the physical device position information table 60 (S41: NO), the channel adapter 21 thereafter returns to step S22 for acquiring the physical device quantity 208 from the policy file 73 in order from the physical device quantity of the first priority, and then repeats the same processing (S22 to S41).

Eventually, when the top physical device reaches line 1F, column 4F in the physical device position information table 60 (S41: YES), the channel adapter 21 thereafter ends the RAID group configuration processing routine RT2 shown in FIG. 21 and FIG. 22 (S42).

VDEV configuration processing in the storage system 1 is now explained. FIG. 23 is a flowchart showing the specific processing routine of the channel adapter 21 in the storage apparatus 3 relating to the VDEV configuration processing in the storage system 1.

When the channel adapter 21 completes the RAID group configuration processing, by executing the VDEV configuration processing program 76 for configuring the VDEV 42, it makes a prescribed RAID group 41 the target RAID group according to the VDEV configuration processing routine RT3 shown in FIG. 23 (S51).

Subsequently, the channel adapter 21 acquires the emulation type of the target RAID group from the emulation information 118 of the RAID group information table 52 (S52).

Then, the channel adapter 21 checks whether the emulation type of the target RAID group acquired from the emulation information 118 of the RAID group information table 52 is an open system (S53).

When the emulation type of the target RAID group acquired from the emulation information 118 of the RAID group information table 52 is not an open system (S53: NO), the channel adapter 21 determines that the emulation type is a mainframe system, and sets the VDEV total with the VDEV capacity to match the emulation type (S54). For instance, since the capacity of the VDEV 42 is a fixed value, the channel adapter 21 sets the total number of VDEVs 42 so that the VDEV 42 of a fixed value can be effectively arranged.

Contrarily, when the emulation type of the target RAID group acquired from the emulation information 118 of the RAID group information table 52 is an open system (S53: YES), the channel adapter 21 checks whether the VDEV capacity has been set in advance to the emulation type (S55).

When the VDEV capacity has not been set in advance to the emulation type (S55: NO), the channel adapter 21 sets the VDEV capacity with the VDEV total in the RAID group of the emulation configuration information 210 corresponding to the emulation type acquired from the policy file 73 (S56).

Subsequently, the channel adapter 21 checks whether the set VDEV capacity is invalid (S57). When the set VDEV capacity is invalid (S57: YES), or when the VDEV capacity has been set in advance to the emulation type (S55: YES), the channel adapter 21 sets the VDEV total with the preset VDEV capacity (S58).

For instance, if the preset VDEV capacity is 2.8 (TB), the channel adapter 21 sets the VDEV total with the quotient obtained by dividing the entire VDEV capacity by 2.8 (TB)+1.

Eventually, the channel adapter 21 sets the VDEV number in an amount of the VDEV total, and, among the above, stores the initial VDEV number as the top VDEV number, which is the top VDEV number of the target RAID group, in the RAID group information table 52 together with the VDEV capacity and the VDEV total (S59).

Subsequently, the channel adapter 21 stores the VDEV number, the emulation information, and the VDEV capacity in the amount of the VDEV total, and the subsequent VDEV number, which is the subsequent VDEV number of the VDEV number, in the VDEV information table 53 (S60). Incidentally, "0xFFFFFFFF" is stored in the terminal subsequent VDEV number.

Then, the channel adapter 21 checks whether the setting of the VDEV 42 for all RAID groups 41 is complete (S61). When the setting of the VDEV 42 for all RAID groups 41 is not complete (S61: NO), the channel adapter 21 makes the subsequent RAID group 41 the target RAID group (S62), thereafter returns once again to step S52 for acquiring the emulation type of the target RAID group from the emulation information 118 of the RAID group information table 52, and then repeats the same processing (S52 to S62).

Eventually, when the setting of the VDEV 42 for all RAID groups 41 is complete (S61: YES), the channel adapter 21 thereafter ends the VDEV configuration processing routine RT3 shown in FIG. 23 (S63).

LDEV configuration processing in the storage system 1 is now explained. FIG. 24 is a flowchart showing the specific processing routine of the channel adapter 21 in the storage apparatus 3 relating to the LDEV configuration processing in the storage system 1.

When the channel adapter 21 completes the VDEV configuration processing, by executing the LDEV configuration processing program 77 for configuring the LDEV 43, it sets "0" in the LDEV counter (not shown) provided inside or outside the channel adapter 21 according to the LDEV configuration processing routine RT4 shown in FIG. 24 (S71).

Subsequently, the channel adapter 21 acquires the capacity of the shared memory 24 from the capacity information 191 of the tuning information table of the shared memory configuration information table 58, and sets the maximum LDEV quantity that can be set from the capacity of the shared memory 24 (S72).

Then, the channel adapter 21 acquires the capacity of the cache memory from the capacity information 181 of the tuning information table of the cache memory configuration information table 57, and sets the maximum LDEV capacity that can be set from the capacity of the shared memory 23 (S73).

The channel adapter 21 thereafter makes a prescribed VDEV 42 the target VDEV, and acquires the emulation type of the target VDEV from the emulation information 132 of the VDEV information table 53 (S74).

Subsequently, the channel adapter 21 makes the VDEV 42 the target VDEV, and checks whether the emulation type of the target VDEV acquired from the emulation information 132 of the VDEV information table 53 is an open system (S75).

When the emulation type of the target VDEV acquired from the emulation information 132 of the VDEV information table 53 is not an open system (S75: NO), the channel adapter 21 determines that the emulation type is a mainframe system, and sets the LDEV total with the LDEV capacity to match the emulation type (S76). For instance, since the capacity of the LDEV 43 is a fixed value, the channel adapter 21 sets the total number of LDEVs 43 so that the VDEV 42 of a fixed value can be effectively arranged.

Contrarily, when the emulation type of the target VDEV acquired from the emulation information 132 of the VDEV information table 53 is an open system (S75: YES), the channel adapter 21 checks whether the LDEV capacity has been set in advance to the emulation type (S77).

When the LDEV capacity has not been set in advance to the emulation type (S77: NO), the channel adapter 21 sets 1 as the LDEV total (S78).

Contrarily, when the LDEV capacity has been set in advance to the emulation type (S77: YES), the channel adapter 21 sets the LDEV capacity with the LDEV total in the VDEV of the emulation configuration information 210 corresponding to the emulation type acquired from the policy file 73 (S79).

Eventually, the channel adapter 21 updates the LDEV counter by adding the amount of the set LDEV total to the LDEV counter (S80).

Subsequently, the channel adapter 21 checks whether the LDEV total is exceeding the settable maximum LDEV quantity (S81). When the LDEV total is exceeding the settable maximum LDEV quantity (S81: YES), the channel adapter 21 proceeds to step S87, and thereafter ends the LDEV configuration processing routine RT4 shown in FIG. 24 (S87).

Contrarily, when the LDEV total is not exceeding the settable maximum LDEV quantity (S81: NO), the channel adapter 21 checks whether the LDEV capacity is exceeding the maximum LDEV capacity (S82). When the LDEV capacity is exceeding the maximum LDEV capacity (S82: YES), the channel adapter 21 proceeds to step S87, and thereafter ends the LDEV configuration processing routine RT4 shown in FIG. 24 (S87).

Contrarily, when the LDEV capacity is not exceeding the maximum LDEV capacity (S82: NO), the channel adapter 21 sets the LDEV number in the amount of the LDEV total, and, among the above, stores the initial LDEV number as the top VDEV number, which is the top VDEV number of the target VDEV, in the VDEV information table 53 together with the LDEV total (S83).

Subsequently, the channel adapter 21 stores the LDEV number in the amount of the LDEV total, the emulation information, the LDEV capacity, the original VDEV number as the VDEV number of the original VDEV 42 of the LDEV 43, and the subsequent LDEV number, which is the subsequent LDEV number of the LDEV number, in the LDEV information table 54 (S84). Incidentally, "0xFFFFFFFF" is stored in the terminal subsequent LDEV number.

In addition, the channel adapter 21 checks whether the setting of the LDEV 43 for all VDEVs 42 is complete (S85). When the setting of the LDEV 43 for all VDEVs 42 is not complete (S85: NO), the channel adapter 21 makes the subsequent VDEV 42 the target VDEV (S86), thereafter returns once again to step S74 for acquiring the emulation type of the target VDEV from the emulation information 132 of the VDEV information table 53, and then repeats the same processing (S74 to S86).

Eventually, when the setting of the LDEV 43 for all VDEVs 42 is complete (S86: YES), the channel adapter 21 thereafter ends the LDEV configuration processing routine RT4 shown in FIG. 24 (S87).

Like this, with the storage system 1, the RAID group 41, the VDEV 42 and the LDEV 43 are set in the storage apparatus 3 from a plurality of physical devices 32 based on the detected information of the fibre channel switch 31 and the physical device 32, and the policy file listing matters to be operated and set by the administrator as parameters in advance.

Therefore, since the storage system 1 is able to automatically configure the RAID group 41, the VDEV 42 and the LDEV 43 from a plurality of physical devices 32, it is possible to effectively prevent the complicated procedures to be performed by the administrator such as manually inputting and configuring the RAID group 41, the VDEV 42 and the LDEV 43. Thereby, the administrator will be able to easily operate the storage apparatus.

Accordingly, with the storage system 1, the RAID group 41, the VDEV 42 and the LDEV 43 can be automatically configured from the plurality of physical devices 32 without having to understand the complicated definitions and concepts of the RAID group 41, the VDEV 42 and the LDEV 43. Thus, it is possible to shorten the time required to configure the RAID group 41, the VDEV 42 and the LDEV 43, as well as the time required in training administrators.

The present invention can be broadly applied to a storage system that sets the configuration of a logical device from a physical device.

What is claimed is:

1. A storage apparatus having a plurality of physical devices for storing data sent from a host system, the storage apparatus comprising:
    a physical device group setting unit for setting a physical device group from said plurality of physical devices based on a policy file which lists matters to be operated and set by an administrator as parameters in advance, and information on said physical devices; and
    a logical device setting unit for setting a logical device from said physical device group based on information on said physical device group set by said physical device group setting unit and said policy file.

2. The storage apparatus according to claim 1, wherein said physical device group setting unit sets a physical device group from said plurality of physical devices with a number of physical devices having a priority capable of configuring said physical device group based on said policy file listing the number of said physical devices configuring said physical device group in descending order of priorities.

3. The storage apparatus according to claim 2, wherein said physical device group setting unit sets a physical device group from said plurality of physical devices with a RAID level having a priority capable of configuring said physical device group based on said policy file listing the RAID levels set upon configuring said physical device group in descending order of priorities.

4. The storage apparatus according to claim 3, wherein said physical device group setting unit sets a physical device group from said plurality of physical devices with an emulation type having a priority capable of configuring said physical device group based on said policy file listing emulation types set upon configuring said physical device group in descending order of priorities.

5. The storage apparatus according to claim 1, wherein said physical device group setting unit sets a physical device group from said plurality of physical devices when said plurality of physical devices are identical or compatible.

6. The storage apparatus according to claim 1, wherein said logical device setting unit sets a maximum settable capacity of the logical device based on a capacity of a cache memory.

7. The storage apparatus according to claim 1, wherein said logical device setting unit sets a maximum number of settable logical devices based on a capacity of a shared memory.

8. A configuration setting method of a storage apparatus having a plurality of physical devices for storing data sent from a host system, the configuration setting method comprising:
    a first step of setting a physical device group from said plurality of physical devices based on a policy file which lists matters to be operated and set by an administrator as parameters in advance, and information on said physical devices;
    a second step of setting a logical device from said physical device group based on information on said physical device group set at said first step and said policy file.

9. The configuration setting method according to claim 8, wherein in said first step, a physical device group is set from said plurality of physical devices with a number of physical devices having a priority capable of configuring said physical device group based on said policy file listing the number of said physical devices configuring said physical device group in descending order of priorities.

10. The configuration setting method according to claim 9, wherein in said first step, a physical device group is set from said plurality of physical devices with a RAID level having a priority capable of configuring said physical device group based on said policy file listing the RAID levels set upon configuring said physical device group in descending order of priorities.

11. The configuration setting method according to claim 10, wherein in said first step, a physical device group is set from said plurality of physical devices with an emulation type having a priority capable of configuring said physical device group based on said policy file listing emulation types set upon configuring said physical device group in descending order of priorities.

12. The configuration setting method according to claim 8, wherein in said first step, a physical device group is set from said plurality of physical devices when said plurality of physical devices are identical or compatible.

13. The configuration setting method according to claim 8, wherein in said second step, a maximum settable capacity of the logical device is set based on a capacity of a cache memory.

14. The configuration setting method according to claim 8, wherein in said second step, a maximum number of settable logical devices is set based on a capacity of a shared memory.

15. A storage apparatus having a plurality of physical devices for storing data sent from a host system, the storage apparatus comprising:
a physical device group setting unit for setting a physical device group from said plurality of physical devices based on configuration information on a logical device provided to said host system and information on said physical devices; and
a logical device setting unit for setting a logical device from said physical device group based on information on said physical device group set by said physical device group setting unit and said configuration information.

* * * * *